United States Patent
Tizhoosh et al.

(10) Patent No.: US 11,042,772 B2
(45) Date of Patent: Jun. 22, 2021

(54) METHODS OF GENERATING AN ENCODED REPRESENTATION OF AN IMAGE AND SYSTEMS OF OPERATING THEREOF

(71) Applicant: Huron Technologies International Inc., St. Jacobs (CA)

(72) Inventors: Hamid Reza Tizhoosh, Waterloo (CA); Morteza Babaie, Qazvin (IR)

(73) Assignee: HURON TECHNOLOGIES INTERNATIONAL INC., St. Jacobs (CA)

( * ) Notice: Subject to any disclaimer, the term of this patent is extended or adjusted under 35 U.S.C. 154(b) by 48 days.

(21) Appl. No.: 16/267,923

(22) Filed: Feb. 5, 2019

(65) Prior Publication Data

US 2019/0303706 A1    Oct. 3, 2019

Related U.S. Application Data

(60) Provisional application No. 62/649,897, filed on Mar. 29, 2018.

(51) Int. Cl.
*G06K 9/46* (2006.01)
*G06K 9/62* (2006.01)
*G06T 5/40* (2006.01)

(52) U.S. Cl.
CPC ......... *G06K 9/4647* (2013.01); *G06K 9/6212* (2013.01); *G06T 5/40* (2013.01)

(58) Field of Classification Search
CPC ...... G06K 9/46; G06K 9/4604; G06K 9/4633; G06K 9/4642; G06K 9/4647;

(Continued)

(56) References Cited

U.S. PATENT DOCUMENTS

| 4,991,092 A | 2/1991 | Greensite ................. 364/413.13 |
| 5,136,660 A | 8/1992 | Flickner et al. ................. 382/46 |

(Continued)

FOREIGN PATENT DOCUMENTS

| EP | 1912160 A1 | 4/2008 |
| WO | 2008089129 A1 | 7/2008 |

OTHER PUBLICATIONS

T. V. Hoang and S.Tabbone, "Invariant pattern recognition using the RFM descriptor," Pattern Recognition, vol. 45, pp. 271-284, 2012.

(Continued)

*Primary Examiner* — Andrew W Johns
(74) *Attorney, Agent, or Firm* — Bereskin & Parr LLP/S.E.N.C.R.L., s.r.l.

(57) ABSTRACT

A computer-implemented method and system are provided for generating an encoded representation for one or more images. The method involves operating a processor to, for at least one image portion of a plurality of image portions of the image, receive a set of projection data representing an image intensity of the image portion along a plurality of projection directions; and identify a subset of projection data from the set of projection data associated with one or more dominant features. The set of projection data includes a subset of projection data for each projection direction of the plurality of projection directions. The processor is operable to generate the encoded representation based at least on a data variation within the subset of projection data for the at least one image portion.

20 Claims, 13 Drawing Sheets

(58) Field of Classification Search
CPC .. G06K 9/6201; G06K 9/6202; G06K 9/6212; G06T 5/40; G06T 9/00; G06T 9/007; H04N 19/25; G06F 16/532
See application file for complete search history.

(56) References Cited

U.S. PATENT DOCUMENTS

| | | | |
|---|---|---|---|
| 5,270,926 | A | 12/1993 | Tam .................. 364/413.19 |
| 5,288,977 | A | 2/1994 | Amendolia et al. .......... 235/375 |
| 5,592,374 | A | 1/1997 | Fellegara et al. ............. 395/203 |
| 6,424,737 | B1 | 7/2002 | Rising, III ..................... 382/156 |
| 7,239,750 | B2 | 7/2007 | Rising .......................... 382/190 |
| 7,949,186 | B2 | 5/2011 | Grauman et al. ............. 382/170 |
| 8,086,587 | B2 | 12/2011 | Obana et al. ................. 707/705 |
| 8,494,268 | B2 | 7/2013 | Soederberg et al. ......... 382/181 |
| 8,872,814 | B1 | 10/2014 | Agaian et al. ................ 345/419 |
| 8,879,120 | B2 | 11/2014 | Thrasher et al. ..... G06T 7/0002 |
| 9,081,822 | B2 | 7/2015 | Xu et al. ............. G06F 17/3053 |
| 9,122,955 | B2 | 9/2015 | Greenspan et al. . G06K 9/4676 |
| 9,316,743 | B2 | 4/2016 | Rousso et al. ........ G01T 1/1603 |
| 9,535,928 | B2 | 1/2017 | Xu et al. ........... G06F 17/30247 |
| 9,710,491 | B2 | 7/2017 | Ke et al. ........... G06F 17/30256 |
| 9,710,695 | B2 | 7/2017 | Xu et al. ............ G06K 9/00147 |
| 2004/0133927 | A1 | 7/2004 | Sternberg et al. ............. 725/136 |
| 2004/0240737 | A1 | 12/2004 | Lim et al. ..................... 382/182 |
| 2006/0204042 | A1 | 9/2006 | Hammoud et al. ........... 382/107 |
| 2006/0257010 | A1 | 11/2006 | George et al. ................. 382/131 |
| 2007/0181691 | A1 | 8/2007 | Chang ..................... 235/462.41 |
| 2008/0260200 | A1 | 10/2008 | Suzaki .......................... 382/100 |
| 2010/0008589 | A1 | 1/2010 | Bober et al. .................. 382/218 |
| 2010/0014780 | A1 | 1/2010 | Kalayeh | |
| 2010/0187311 | A1 | 7/2010 | van der Merwe et al. ................... 235/462.01 |
| 2012/0043377 | A1 | 2/2012 | Haar et al. ..................... 235/375 |
| 2013/0048731 | A1 | 2/2013 | Flickner et al. ......... 235/462.12 |
| 2013/0098983 | A1 | 4/2013 | Neff ............................... 235/375 |
| 2014/0142979 | A1 | 5/2014 | Mitsunaga ............. G06Q 50/24 |
| 2014/0263674 | A1 | 9/2014 | Cerveny .......... G06K 19/06028 |
| 2014/0307934 | A1 | 10/2014 | Batenburg et al. ... G06T 11/005 |
| 2017/0091281 | A1* | 3/2017 | Tizhoosh .............. G06F 16/583 |

OTHER PUBLICATIONS

D. Jadhav and R. Holambe, "Feature extraction using radon and wavelet transforms with application to face recognition," Neurocomputing, vol. 72, pp. 1951-1959, 2009.
W. Zhao, G. Zhou, T. Yue, B. Yang, X. Tao, J. Huang, and C. Yang, "Retrieval of ocean wavelength and wave direction from sar image based on radon transform," in IEEE International Geoscience and Remote Sensing Symposium, 2013, pp. 1513-1516, Jul. 21-26, 2013, Melbourne, Victoria, Australia.
Y. Chen and Y. Chen, "Invariant description and retrieval of planar shapes using radon composite features," IEEE Transactions on Signal Processing, vol. 56(10), pp. 4762-4771, 2008.
S. Tabbone, O. Terrades, and S. Barrat, "Histogram of radon transform. a useful descriptor for shape retrieval," in 19th International Conference on Pattern Recognition (ICPR 2008), Dec. 8-11, 2008, Tampa, Florida, USA. IEEE Computer Society 2008, pp. 1-4.
P. Daras, D. Zarpalas, D. Tzovaras, and M. Strintzis, "Efficient 3-d model search and retrieval using generalized 3-d radon transforms," Multimedia, IEEE Transactions on, vol. 8(1), pp. 101-114, 2006.
A. Kadyrov and M. Petrou, "The trace transform and its applications," IEEE Trans. on Pattern Analysis and Machine Intell., vol. 23, No. 8, pp. 811-828, 2001.
L. Heutte, T. Paquet, J. Moreau, Y. Lecourtier, and C. Olivier, "A structural/statistical feature based vector for handwritten character recognition," Pattern Recognition Letters, vol. 19, No. 7, pp. 629-641, 1998.
K. Jafari-Khouzani and H. Soltanian-Zadeh, "Radon transform orientation estimation for rotation invariant texture analysis," IEEE Transactions on Pattern Analysis and Machine Intelligence, vol. 27, No. 6, pp. 1004-1008, 2005.

H. Tizhoosh, "Barcode annotations for medical image retrieval: A preliminary investigation," in Image Processing (ICIP), 2015 IEEE International Conference on, pp. 818-822, Sep. 27-30, 2015, Quebec City, Quebec, CA.
H. R. Tizhoosh, S. Zhu, H. Lo, V. Chaudhari, and T. Mehdi, "MinMax Radon Barcodes for Medical Image Retrieval," Springer International Publishing, 2016, pp. 617-627.
M. Babaie, S. Kalra, A. Sriram, C. Mitcheltree, S. Zhu, S. Khatami, A. Rahnamayan, and H. Tizhoosh, "Classification and retrieval of digital pathology scans: A new dataset," in Workshop for Computer Vision for Microscopy Image Analysis (CVMI 2017). CVPR, Jul. 21-26, 2017, Honolulu, Hawaii, USA.
M. Babaie, H.R. Tizhoosh, A. Khatami, and M.E. Shiri, "Local Radon Descriptors for Image Search," 7th Int. Conf. on Image Processing Theory, Tools and Applications (IPTA 2017), Nov. 28-Dec. 1, 2017, Montreal, Quebec, CA.
K. Rajendran and K. BR "Radon Transform based Local Tomography Algorithm for 3D Reconstruction," Int'l Journal of Biology and Biomedical Eng., Issue 1, vol. 6, pp. 1-8, 2012.
M. Babaie, H.R. Tizhoosh, S. Zhu, and M.E. Shiri, "Retrieving Similar X-ray Images from Big Image Data using Radon Barcodes with Single Projections," Proc. 6th Int'l Conf. on Pattern Recognition Applications and Methods (ICPRAM 2017), pp. 557-566, Feb. 24-26, 2017, Porto, Portugal.
Daugman, "How iris recognition works", IEEE Transactions on Circuits and Systems for Video Technology, Jan. 2004, vol. 14 (1), pp. 21-30.
Leutenegger et al., "Brisk: Binary Robust Invariant Scalable Key Points", in Proceedings of the 2011 IEEE International Conference on Computer Vision, Nov. 6-13, 2011, pp. 2548-2555.
Muja et al., "Fast Matching of Binary Features," in Proceedings of the 2012 Ninth Conference on Computer and Robot Vision, May 28-30, 2012, CRV '12, pp. 404-410.
Nacereddine et al., "Shape-Based Image Retrieval Using a New Descriptor Based on the Radon and Wavelet Transforms", in International Conference on Pattern Recognition, Aug. 23-26, 2010, pp. 1197-2000.
Ojala et al., "MultiResolution Gray-Scale and Rotation invariant Texture Classification with Local Binary Patterns," IEEE Transactions on Pattern Analysis & Machine Intelligence, Aug. 7, 2002, vol. 24 (7), pp. 971-987.
Seo et al., "A robust image fingerprinting using the Radon transform", Department of EECS, KAIST, 373-1 Guseong Jong, Yuseong Gu, Daejeon 305-701, South Korea Philips Research Eindhoven, Prof. Holstlaan 4, Eindhoven 5656AA, The Netherlands; May 6, 2003 (15 pages).
Sundermeyer et al., "LSTM Neural Networks for Language Modeling", Human Language Technology and Pattern Recognition, Computer Science Department, RWTH Aschen University, Aachen, Germany (4 pages).
Kieffer, et al,. (Nov. 2017). Convolutional neural networks for histopathology image classification: training vs. using pre-trained networks. In 2017 Seventh International Conference on Image Processing Theory, Tools and Applications (IPTA) (pp. 1-6). IEEE.
Hunt et al., "A Microdissection and Molecular Genotyping Assay to Confirm the Identity of Tissue Floaters in Paraffin-Embedded Tissue Blocks", Molecular Identification of Tissue Floaters, Arch Pathol Lab Med, vol. 127, Feb. 2003, pp. 213-217.
Lowe, "Object recognition from local scale-invariant features." Computer vision, 1999. The proceedings of the seventh IEEE international conference on vol. 2. Ieee, 1999 (8 pages).
Kohonen, "The self-organizing map." Proceedings of the IEEE 78.9 (1990): 1464-1480.
Hartigan, et al., "Algorithm AS 136: A k-means clustering algorithm." Journal of the Royal Statistical Society. Series C (Applied Statistics) 28.1 (1979): 100-108.
Vinyals, et al., (2017). Show and tell: Lessons learned from the 2015 mscoco image captioning challenge. IEEE transactions on pattern analysis and machine intelligence, 39(4), 652-663.
Bayramoglu, N., Kannala, J., & Heikkilä, J. (Dec. 2016). Deep learning for magnification independent breast lancer histopathology image classification. In 2016 23rd International conference on pattern recognition (ICPR) (pp. 2440-2445). IEEE.

(56) References Cited

OTHER PUBLICATIONS

Liu, Y., Gadepalli, K., Norouzi, M., Dahl, G. E., Kohlberger, T., Boyko, A., . . . & Hipp, J. D. (2017). Detecting cancer metastases on gigapixel pathology images. arXiv preprint arXiv:1703.02442 (13 pages).

Sellaro, T. L., Filkins, R., Hoffman, C., Fine, J. L., Ho, J., Parwani, A. V., . . . & Montalto, M. (2013). Relationship between magnification and resolution in digital pathology systems. Journal of pathology informatics, 4 (5 pages).

Song, Y., Zhang, L., Chen, S., Ni, D., Lei, B., & Wang, T. (2015). Accurate segmentation of cervical cytoplasm and nuclei based on multiscale convolutional network and graph partitioning. IEEE Transactions on Biomedical Engineering, 62(10), 2421-2433.

Romo, D., Garcia-Arteaga, J. D., Arbeláez, P., & Romero, E (Mar. 2014). A discriminant multi-scale histopathology descriptor using dictionary learning. In Medical Imaging 2014: Digital Pathology (vol. 9041, p. 90410Q). International Society for Optics and Photonics (7 pages).

Doyle, S., Madabhushi, A., Feldman, M., & Tomaszeweski, J. (Oct. 2006). A boosting cascade for automated letection of prostate cancer from digitized histology. In International conference on medical image computing and computer-assisted intervention (pp. 504-511). Springer, Berlin, Heidelberg.

Tizhoosh, Hamid Reza, and Liron Pantanowitz. "Artificial intelligence and digital pathology: Challenges and ppportunities." Journal of pathology informatics 9 (2018) (16 pages).

Kumar, Meghana Dinesh, et al. "A comparative study of cnn, bovw and lbp for classification of histopathological images." 2017 IEEE Symposium Series on Computational Intelligence (SSCI). IEEE, 2017 (8 pages).

ISA/CA, International Search Report and Written Opinion of the ISA, dated Apr. 18, 2019, re PCT International Application No. PCT/CA2019/050035.

\* cited by examiner

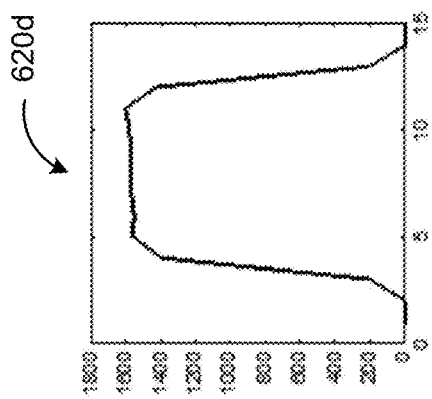
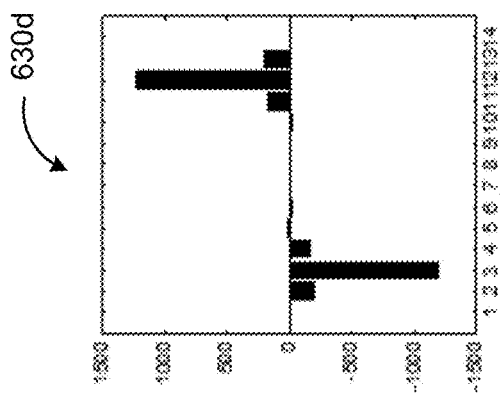
FIG. 7A FIG. 7B FIG. 7C FIG. 7D
FIG. 8A FIG. 8B FIG. 8C FIG. 8D

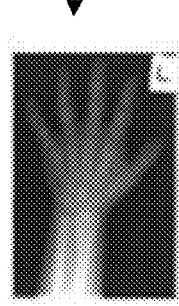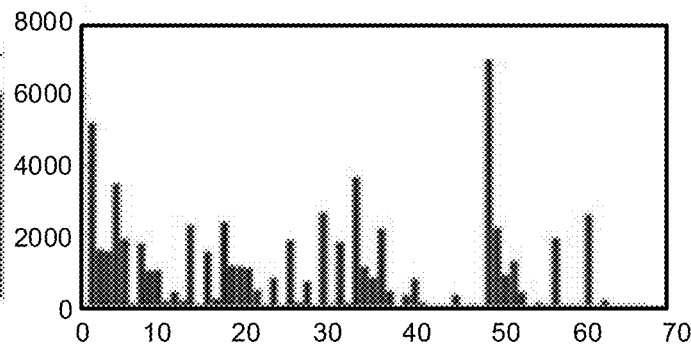
FIG. 12A  FIG. 12B
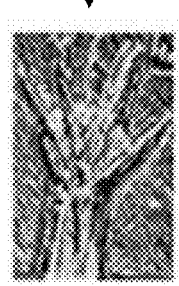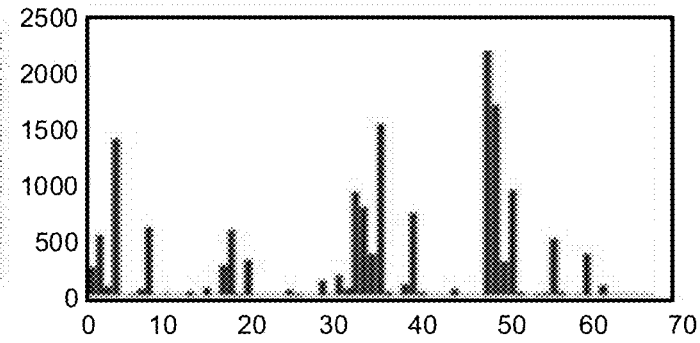
FIG. 12C  FIG. 12D
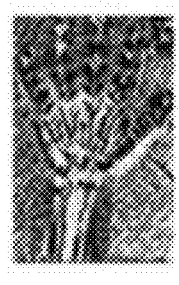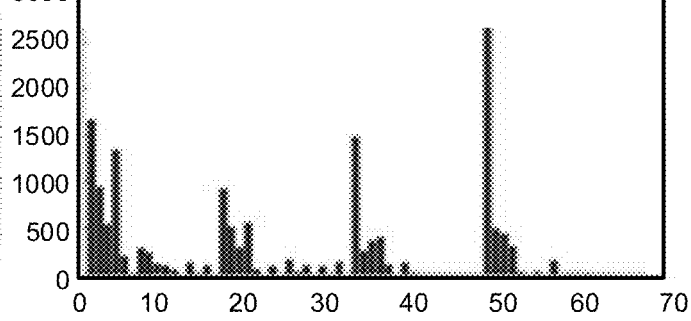
FIG. 12E  FIG. 12F

METHODS OF GENERATING AN ENCODED REPRESENTATION OF AN IMAGE AND SYSTEMS OF OPERATING THEREOF

CROSS-REFERENCE TO RELATED PATENT APPLICATION

The application claims the benefit of U.S. Provisional Application No. 62/649,897, filed on Mar. 29, 2018. The complete disclosure of U.S. Provisional Application No. 62/649,897 is incorporated herein by reference.

FIELD

The described embodiments relate to systems and methods of generating an encoded representation of an image.

BACKGROUND

Digital images and videos are increasingly common forms of media. As more digital content is generated and becomes available, the usefulness of that digital content largely depends on its management.

Some existing practices involve associating the digital content with searchable descriptors. Although some of these descriptors may be automatically generated, these descriptors are typically generated based on features and/or qualities identified from human observations and judgement. In addition to the amount of time required for a human to observe and generate descriptive descriptors for the digital content, the descriptors may not be universal or adaptable between different systems. Also, existing descriptors can be limited by the extent in which the digital content can be processed.

SUMMARY

The various embodiments described herein generally relate to methods (and associated systems configured to implement the methods) for generating an encoded representation for one or more images.

An example method involves operating a processor to, for at least one image portion of a plurality of image portions of an image of the one or more images, receive a set of projection data representing an image intensity of the image portion along a plurality of projection directions; and identify a subset of projection data from the set of projection data associated with one or more dominant features. The set of projection data includes a subset of projection data for each projection direction of the plurality of projection directions. The method also involves operating the processor to generate the encoded representation based at least on a data variation within the subset of projection data for the at least one image portion.

In some embodiments, generating the encoded representation based on the data variation within the subset of projection data can include determining a direction of change between each sequential projection data within the subset of projection data; and converting the direction of change to a binary representation.

In some embodiments, the method can include converting the binary representation to an integer value.

In some embodiments, determining the direction of change between each sequential projection data within the subset of projection data can include calculating a derivative for the subset of projection data.

In some embodiments, converting the direction of change to the binary representation can include assigning an increase indicator to an increasing direction of change; and assigning a decrease indicator to a decreasing direction of change.

In some embodiments, generating the encoded representation can include generating the encoded representation based on the data variations in the subsets of projection data associated with two or more image portions in the plurality of image portions.

In some embodiments, the method can include representing the data variations in the subsets of projection data for the two or more image portions as two or more respective integer values; and determining an occurrence frequency for each respective integer value.

In some embodiments, generating the encoded representation can include generating a histogram to represent the occurrence frequency for each respective integer value.

In some embodiments, identifying the subset of projection data associated with the one or more dominant features can include determining a projection direction associated with the subset of projection data associated with the one or more dominant features and assigning that projection direction as a principal projection direction; and selecting one or more supplemental projection directions based on the principal projection direction. In addition, generating the encoded representation can be based on the data variations in the subsets of projection data associated with the principal projection direction and each selected supplemental projection direction.

In some embodiments, the method can include for each subset of projection data, representing the data variation in the respective subset of projection data with an integer value; and determining an occurrence frequency of each respective integer value.

In some embodiments, the method can include generating a histogram to represent the occurrence frequency of each respective integer value.

In some embodiments, the method can include generating the encoded representation based on the data variations in the sets of projection data for two or more image portions in the plurality of image portions; and for each projection direction of the principal projection direction and the selected supplemental projection directions, determining the occurrence frequency of the respective integer values of the two or more image portions.

In some embodiments, the method can include generating a histogram for each projection direction to represent the respective occurrence frequency.

In some embodiments, selecting the one or more supplemental projection directions based on the principal projection direction can include assigning the one or more supplemental projection directions to be at substantially equal angular separation from an adjacent supplemental projection direction, and each supplemental projection direction adjacent to the principal projection direction can be at the substantially equal angular separation from the principal projection direction.

In some embodiments, the one or more supplemental projection directions can include three supplemental projection directions separated by an angular separation of 45° from each other, and each supplemental projection adjacent to the principal projection direction can be separated by the angular separation of 45° from the principal projection direction.

In some embodiments, the generating the encoded representation based on the data variations in the subset of projection data can include representing the data variations in the subsets of projection data for the two or more image portions as two or more respective integer values; and determining an occurrence frequency of the two or more respective integer values.

In some embodiments, the method can include generating a histogram to represent the occurrence frequency.

In some embodiments, identifying the subset of projection data associated with the one or more dominant features can include determining, from the set of projection data, the subset of projection data having a greatest variance.

In some embodiments, identifying the subset of projection data associated with the one or more dominant features can include determining, from the set of projection data, the subset of projection data having a greatest value.

In some embodiments, the method can further include, for each image portion, determining whether a homogeneity level of the image portion exceeds a homogeneity threshold, the homogeneity level representing an intensity variation within the image data intensity of the image portion; and in response to determining the homogeneity level of that image portion exceeds the homogeneity threshold, excluding that image portion from the encoded representation, otherwise, indicating that image portion is usable for the encoded representation.

In some embodiments, receiving the set of projection data representing the image intensity of the image portion along the plurality of projection directions can involve receiving the set of projection data from the plurality of directions including 0° to 180°.

In some embodiments, the method can include dividing the image into the plurality of image portions, wherein a dimension of each image portion is characterized by a substantially similar number of pixels.

In another broad aspect, a system for generating an encoded representation for one or more images is described. The system can include a communication component and a processor in communication with the communication component. The communication component can provide access to the one or more images via a network. The processor can be operable to, for at least one image portion of a plurality of image portions of an image of the one or more images, receive a set of projection data representing an image intensity of the image portion along a plurality of projection directions; and identify a subset of projection data from the set of projection data associated with one or more dominant features. The set of projection data can include a subset of projection data for each projection direction of the plurality of projection directions. The processor can be operable to generate the encoded representation based at least on a data variation within the subset of projection data for the at least one image portion.

In some embodiments, the processor can be operable to determine a direction of change between each sequential projection data within the subset of projection data; and convert the direction of change to a binary representation.

In some embodiments, the processor can be operable to convert the binary representation to an integer value.

In some embodiments, the processor can be operable to calculate a derivative for the subset of projection data.

In some embodiments, the processor can be operable to assign an increase indicator to an increasing direction of change; and assign a decrease indicator to a decreasing direction of change.

In some embodiments, the processor can be operable to generate the encoded representation based on the data variations in the subsets of projection data associated with two or more image portions in the plurality of image portions.

In some embodiments, the processor can be operable to represent the data variations in the subsets of projection data for the two or more image portions as two or more respective integer values; and determine an occurrence frequency for each respective integer value.

In some embodiments, the processor can be operable to generate a histogram to represent the occurrence frequency for each respective integer value.

In some embodiments, the processor can be operable to determine a projection direction associated with the subset of projection data associated with the one or more dominant features and assigning that projection direction as a principal projection direction; select one or more supplemental projection directions based on the principal projection direction; and generate the encoded representation based on the data variations in the subsets of projection data associated with the principal projection direction and each selected supplemental projection direction.

In some embodiments, the processor can be operable to for each subset of projection data, represent the data variation in the respective subset of projection data with an integer value; and determine an occurrence frequency of each respective integer value.

In some embodiments, the processor can be operable to generate a histogram to represent the occurrence frequency of each respective integer value.

In some embodiments, the processor can be operable to generate the encoded representation based on the data variations in the sets of projection data for two or more image portions in the plurality of image portions; and for each projection direction of the principal projection direction and the selected supplemental projection directions, determine the occurrence frequency of the respective integer values of the two or more image portions.

In some embodiments, the processor can be operable to generate a histogram for each projection direction to represent the respective occurrence frequency.

In some embodiments, the processor can be operable to assign the one or more supplemental projection directions to be at substantially equal angular separation from an adjacent supplemental projection direction, and each supplemental projection direction adjacent to the principal projection direction can be at the substantially equal angular separation from the principal projection direction.

In some embodiments, the one or more supplemental projection directions can include three supplemental projection directions separated by an angular separation of 45° from each other, and each supplemental projection adjacent to the principal projection direction can be separated by the angular separation of 45° from the principal projection direction.

In some embodiments, the processor can be operable to represent the data variations in the subsets of projection data for the two or more image portions as two or more respective integer values; and determine an occurrence frequency of the two or more respective integer values.

In some embodiments, the processor can be operable to generate a histogram to represent the occurrence frequency.

In some embodiments, the processor can be operable to determine, from the set of projection data, the subset of projection data having a greatest variance.

In some embodiments, the processor can be operable to determine, from the set of projection data, the subset of projection data having a greatest value.

In some embodiments, the processor can be operable to, for each image portion, determine whether a homogeneity level of the image portion exceeds a homogeneity threshold, the homogeneity level representing an intensity variation within the image data intensity of the image portion; and in response to determining the homogeneity level of that image portion exceeds the homogeneity threshold, exclude that image portion from the encoded representation, otherwise, indicate that image portion is usable for the encoded representation.

In some embodiments, the processor can be operable to receive the set of projection data from the plurality of directions including 0° to 180°.

In some embodiments, the processor can be operable to divide the image into the plurality of image portions, wherein a dimension of each image portion is characterized by a substantially similar number of pixels.

In some embodiments, the dimension of each image portion can be 10×10 pixels.

In some embodiments, at least one image portion of the plurality of image portions can overlap with a neighbouring image portion.

In some embodiments, the image can include a medical image.

In some embodiments, the set of projection data can be generated from applying Radon transform to the image portion.

In some embodiments, the communication component can receive the image from an imaging device via the network.

BRIEF DESCRIPTION OF THE DRAWINGS

Several embodiments will now be described in detail with reference to the drawings, in which:

FIG. 7A is a graph of the amplitude values of the projection data along a principal projection direction for the image portion shown in FIG. 4B;

FIG. 7B is a graph of the amplitude values of the projection data along a first supplemental projection direction for the image portion shown in FIG. 4B;

FIG. 7C is a graph of the amplitude values of the projection data along a second supplemental projection direction for the image portion shown in FIG. 4B;

FIG. 7D is a graph of the amplitude values of the projection data along a third supplemental projection direction for the image portion shown in FIG. 4B;

FIG. 8A is a graph of a derivative of the amplitude values shown in FIG. 7A;

FIG. 8B is a graph of a derivative of the amplitude values shown in FIG. 7B;

FIG. 8C is a graph of a derivative of the amplitude values shown in FIG. 7C;

FIG. 8D is a graph of a derivative of the amplitude values shown in FIG. 7D;

FIG. 12A shows another example image;

FIG. 12B is a histogram representative of the image of FIG. 12A;

FIG. 12C is a graphical illustration of the projection data taken along a principal projection direction of the image of FIG. 12A;

FIG. 12D is a histogram representative of the image of FIG. 12C;

FIG. 12E is a graphical illustration of the projection data taken along a supplemental projection direction of the image shown in FIG. 12A;

FIG. 12F is a histogram representative the image of FIG. 12E;

Figure 1:
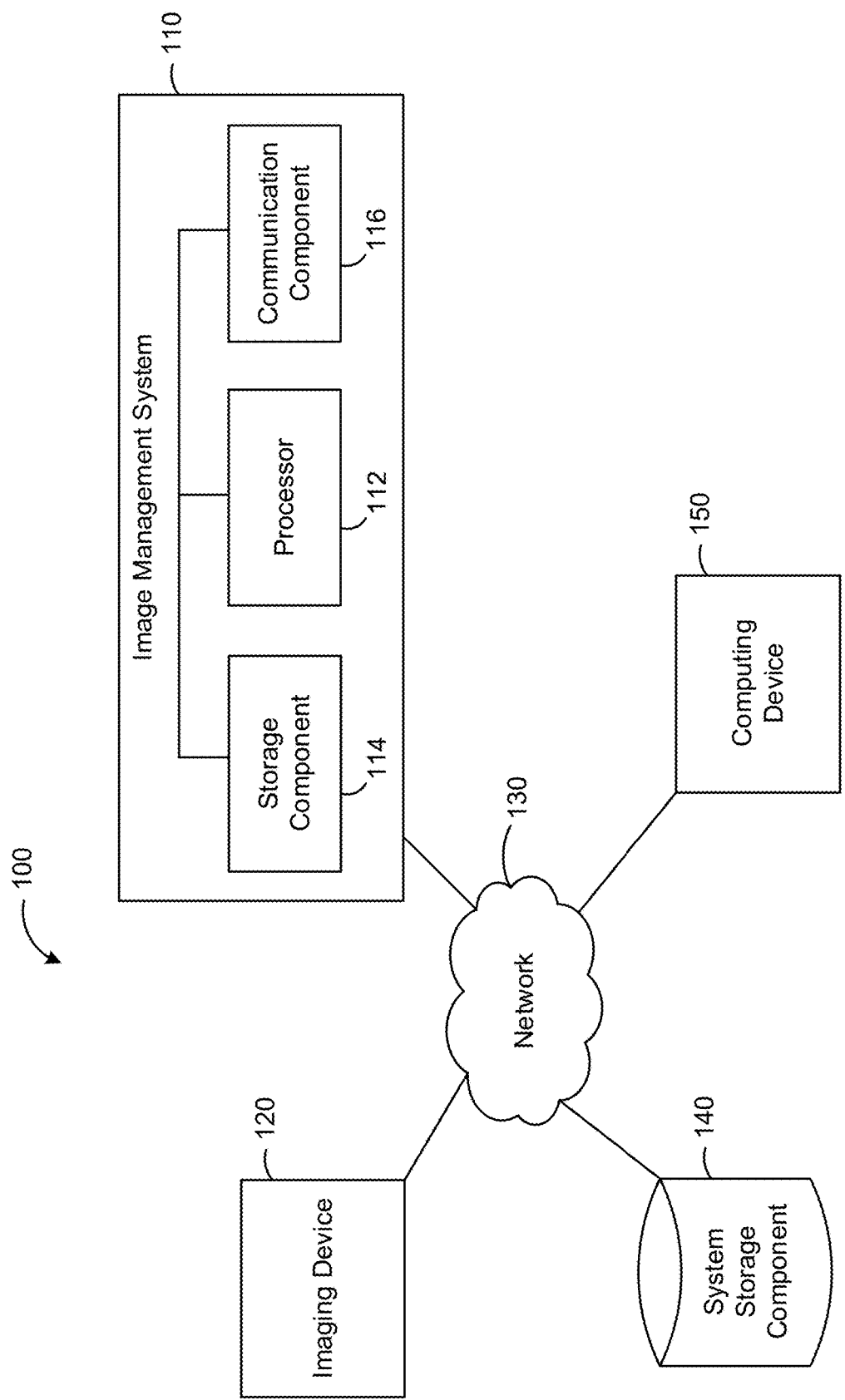
FIG. 1 is a block diagram of an imaging system, in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to methods (and associated systems configured to implement the methods) for generating an encoded representation of one or more images.

Existing practices involve associating images with image descriptors that are searchable to assist with the management of the image data. Keyword or tag descriptor-based approaches require manual human annotation and judgement, which can be impractical in view of the large amount of image and video data that typically needs to be processed.

Although some of these descriptors may be automatically generated, these descriptors are typically generated based on features and/or qualities identified from human observations and judgement. In addition to the amount of time required for a human to observe and generate descriptive descriptors for the digital content, the descriptors may not be universal or adaptable between different systems.

In many image processing systems, the quality of the descriptors can be limited by the computer resources. Depending on the resolution of an image, existing image descriptors may be insufficient to accurately identify similar images. Existing image descriptors can be complex and involve computationally intensive calculations. The computational power may not readily be available and/or insufficient to handle the growing amount of digital content being generated. As well, the existing image descriptors can require large amount of storage capacity, which results in additional cost or may not be available at all.

In the medical field, for example, medical images of patients are regularly captured for diagnostic and/or monitoring purposes. Medical images can be generated by many different imaging devices and undergo visual or numerical investigation for medical diagnoses and research. These medical images are typically archived and may be retrieved for a later purpose (e.g., research or educational, etc.). Timely and consistent representation of these images can likely assist with diagnosis. Similarly, many other sectors, such as architectural and engineering design, geoinformatics, museum and gallery collections, retail catalogs, material processing, military and defense applications, surveillance and forensics, can also benefit from efficient and consistent management of image data.

The ability to efficiently and consistently classify images, and retrieve those images can be advantageous for these sectors. For example, in the medical field, as medical images are analyzed for a medical diagnosis, the medical images are often compared with archived images of diagnosed cases to assist with the diagnosis. Also, the present diagnosis can benefit from archived images, which may have been clinically evaluated and annotated for second opinions, research, or educational purposes. Existing image descriptors can facilitate the retrieval of archived images and the retrieval of similar images but the image descriptors may be inconsistent between medical facilities and equipment.

Encoded representations of images generated in accordance with the methods and systems described herein can classify the images consistently and do not require high storage capacity. The encoded representations can then be used to identify analogous images for comparison.

The encoded representations generated from the methods and systems disclosed herein can be applied in content-based image retrieval (CBIR) methods.

Reference is first made to FIG. 1, which illustrates an example block diagram 100 of an image management system 110 in communication with an imaging device 120, a system storage component 140, and a computing device 150 via a network 130. Although only one imaging device 120 and one computing device 150 are shown in FIG. 1, the image management system 110 can be in communication with include fewer or more imaging devices 120 and fewer or more computing devices 150. The image management system 110 can communicate with the devices 120, 150 over a wide geographic area via the network 130.

The imaging device 120 can include any device capable of capturing image data and/or generating images, and/or storing image data.

As shown in FIG. 1, the image management system 110 includes a processor 112, a storage component 114, and a communication component 116. The image management system 110 may include one or more servers that may be distributed over a wide geographic area and connected via the network 130. In some embodiments, each of the processor 112, the storage component 114 and the communication component 116 may be combined into a fewer number of components or may be separated into further components.

The processor 112 may be any suitable processors, controllers, digital signal processors, graphics processing units, application specific integrated circuits (ASICs), and/or field programmable gate arrays (FPGAs) that can provide sufficient processing power depending on the configuration, purposes and requirements of the image management system 110. In some embodiments, the processor 112 can include more than one processor with each processor being configured to perform different dedicated tasks.

The processor 112 may be configured to control the operation of the image management system 110. The processor 112 can include modules that initiate and manage the operations of the image management system 110. The processor 112 may also determine, based on received data, stored data and/or user preferences, how the image management system 110 may generally operate.

The communication component 116 may be any interface that enables the image management system 110 to communicate with other devices and systems. In some embodiments, the communication component 116 can include at least one of a serial port, a parallel port or a USB port. The communication component 116 may also include at least one of an Internet, Local Area Network (LAN), Ethernet, Firewire, modem, fiber, or digital subscriber line connection. Various combinations of these elements may be incorporated within the communication component 116.

For example, the communication component 116 may receive input from various input devices, such as a mouse, a keyboard, a touch screen, a thumbwheel, a track-pad, a track-ball, a card-reader, voice recognition software and the like depending on the requirements and implementation of the image management system 110.

The storage component 114 can include RAM, ROM, one or more hard drives, one or more flash drives or some other suitable data storage elements such as disk drives, etc. The storage component 114 is used to store an operating system and programs, for example. For instance, the operating system provides various basic operational processes for the processor. The programs include various user programs so that a user can interact with the processor to perform various functions such as, but not limited to, viewing and/or manipulating the image data as well as retrieving and/or transmitting image data as the case may be.

In some embodiments, the storage component 114 can store the images, information related to encoded representations of the images, and information related to the imaging devices 120.

The storage component 114 may include one or more databases (not shown) for storing image data and information relating to the image data, such as, for example, patient data with respect to the image data.

Similar to the storage component 114, the system storage component 140 can store images and information related to images. Images and information related to images can be stored in the system storage component 140 for retrieval by the computing device 150 or the image management system 110.

Images described herein can include any digital image with any number of pixels. The images can have any size and resolution. In some embodiments, the size and resolution of the image can be adjusted in one or more pre-processing stages. Example image pre-processing includes normalizing the pixel dimensions of an image and digital filtering for noise reduction.

An example image is a medical image of a body part, or part of a body part. A medical image can be generated using any modality, including but not limited to microscopy, X-ray radiography, magnetic resonance imaging (MRI), ultrasound, and/or computed tomography scans (CT scans). Microscopy can include, but is not limited to whole slide imaging (WSI), reflected light, brightfield, transmitted light, fluorescence, and photoluminescence.

The image can be a black and white, grey-level, RGB color, or false color image. An image data structure typically includes an intensity value at each pixel location. To capture a wide dynamic range of intensity values, the data structure of the image uses a number of data bits to represent each pixel.

Sub-images, or patches, can also be defined within images. The dimensions of a patch are smaller than the dimensions of the image itself.

Information related to encoded representations of images that may be stored in the storage component 114 or the system storage component 140 may, for example, include but is not limited to the encoded representations of images, image portion dimensions and strides, projection data, projection directions, including principal and supplemental projection directions, histograms, and sinograms.

Information related to image annotations that may be stored in the storage component 114 or the system storage component 140 may, for example, include but is not limited to text comments, audio recordings, markers, shapes, lines, free form mark-ups, and measurements.

Information related to imaging devices that may be stored in the storage component 114 or the system storage component 140 may, for example, include but is not limited to a device identifier, a device location, a device operator, a modality, supported image resolutions, supported image file types, image size range, image margin ranges, and an image scale range.

Information related to image subjects that may be stored in the storage component 114 or the system storage component 140 may, for example, include but is not limited to a patient identifier, a date of birth, gender, home address, primary physician, and medical team in the case of medical images.

The computing device 150 may be any networked device operable to connect to the network 130. A networked device is a device capable of communicating with other devices through a network such as the network 130. A network device may couple to the network 130 through a wired or wireless connection.

The computing device 150 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

In some embodiments, the computing device 150 may be a laptop, or a smartphone device equipped with a network adapter for connecting to the Internet. In some embodiments, the connection request initiated from the computing device 150 may be initiated from a web browser and directed at the browser-based communications application on the image management system 110.

The network 130 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the image management system 110, the imaging device 120, the system storage component 140, and the computing device 150.

When the encoded representations disclosed herein are generated, the associated images are encoded, or indexed. The encoded representation represents a content of the image. In this way, the indexed image can be searched according to the encoded representation. A database of indexed images, or of links to indexed images, can be used in the image management system 110 to compare and retrieve similar or related images.

When encoding an image, the processor 112 can populate the storage component 114 or the system storage component 140 with the image. For example, the communication component 116 can receive the image from the imaging device 120. The processor 112 can then process the image according to the methods described herein. The processor 112 can generate an encoded representation for the image and store the encoded representation. In some embodiments, the encoded representation may be embedded as metadata in the image file.

When searching for an image and retrieving the image, the processor 112 can generate an image query based on the encoded representation and trigger a search for the associated image in the storage component 114 or the system storage component 140. The image query generated by the processor 112 can search the storage component 114 or the system storage component 140 for similar encoded representations. The retrieved similar encoded representation can direct the processor 112 to the related images stored in the storage component 114 or in the system storage component 140. The processor 112 can retrieve the associated image with an image query search, for example.

A degree of similarity between encoded representations can be determined by comparing the bit values between the encoded representations. In some embodiments, a degree of similarity between the encoded representations may be determined with a Hamming distance calculation.

The image(s) associated with the similar stored encoded representation(s) is useful to the user running the image query search on the image management system 110. In the medical imaging context, a medical professional (radiologist, pathologist, diagnostician, researcher, etc.) may scan a patient and use the image to search for more information about the patient's illness.

For example, the processor 112 can receive an image query that defines a size, shape, and location of a tumor. The processor 112 can then trigger a search for images that satisfy that image query. When the image management system 110 receives the search results, the communication component 116 can display the resulting images to the user for review. In some embodiments, the resulting images can be displayed at the computing device 150. The image management system 110 can provide further information in respect to each of the results for the user, such as the medical case information of each result. Accordingly, the user can see how previous patients with a similar tumor were diagnosed, treated and evaluated.

In some embodiments, the image management system 110 can receive images directly from the imaging device 120. The image management system 110 may process query images, generate encoded representations, and retrieve similar images in real-time or nearly in real-time, as the query images are being received from the imaging device 120. By increasing the speed in which the query image can be reviewed and analyzed with respect to an archive of images in real-time, or near real-time, the disclosed image management system 110 can significantly improve patient care and responsiveness.

In the context of the present disclosure, the terms "real-time" or "near real-time" is defined as image processing that is concurrent to, or within a small temporal window of, the query image acquisition or generation. The purpose of real-time or near real-time image processing is to deliver search and retrieval results from the image management system 110 to the user within seconds or minutes after a medical imaging scan of the patient. Accordingly, related medical case information may be delivered to the patient's doctor with minimal delay, for a timely diagnosis of the patient's illness.

In some embodiments, images can be loaded into the image management system 110 from the system storage component 140 or computing device 150 that is remote from the image management system 110. For example, the image management system 110 may be used to process offsite data. Processing offsite data or non-time-sensitive data is suited to research applications where real-time processing (i.e., concurrent to image acquisition or generation) is not necessary. A researcher tasked with processing hundreds or thousands of medical images would still benefit from the increased processing speed of the image management system 110 over conventional feature detection-based CBIR systems, even if the hundreds or thousands of medical images are not related to any patients awaiting diagnosis.

Figure 2:
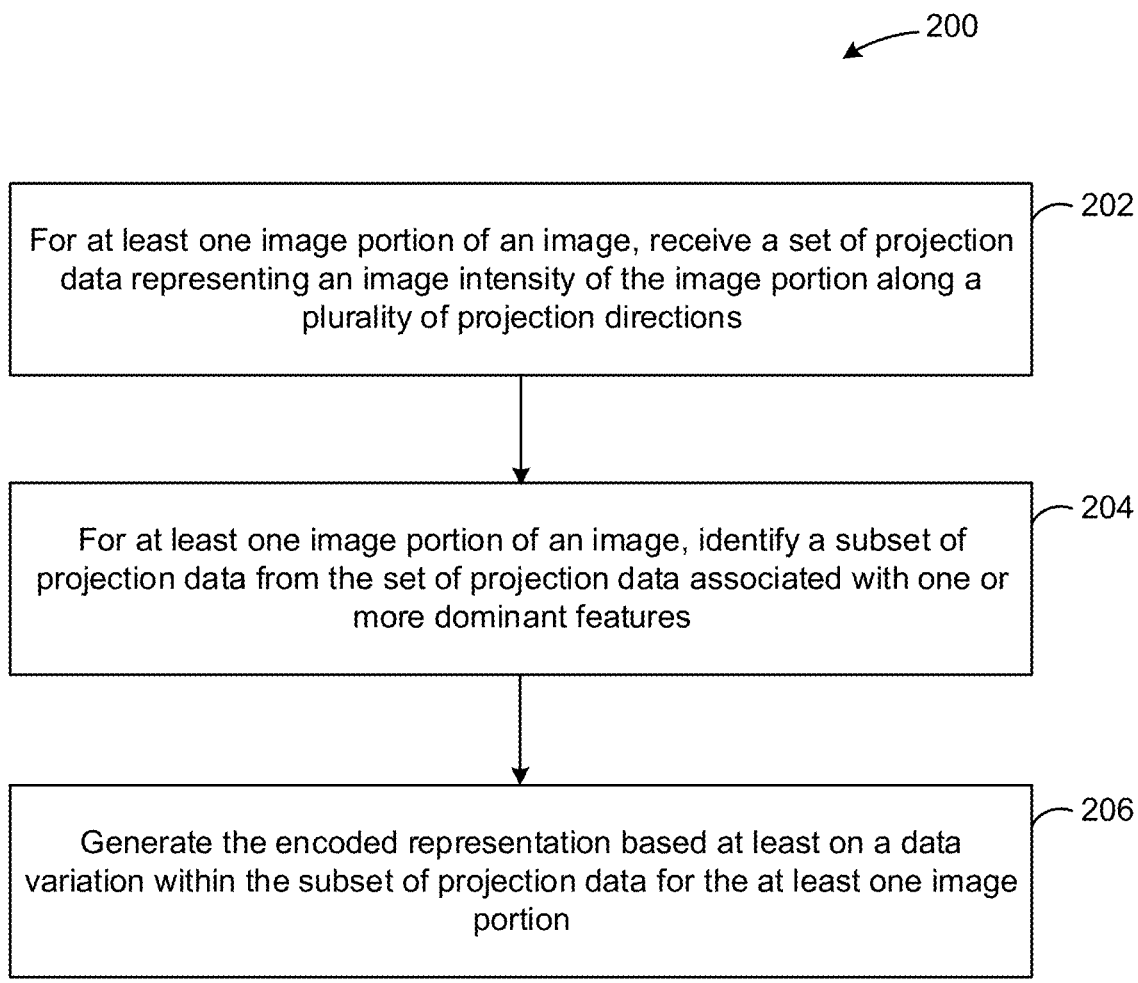
FIG. 2 is a flowchart of an example method for generating an encoded representation of an image.

Referring now to FIG. 2, an example method 200 for generating an encoded representation of an image is shown in a flowchart diagram. To assist with the description of the method 200, reference will be made simultaneously to FIGS. 4A to 10.

At 202, for at least one image portion of a plurality of image portions of the image, the processor 112 receives a set of projection data representing an image intensity of the image portion along a plurality of projection directions.

Figure 4A:
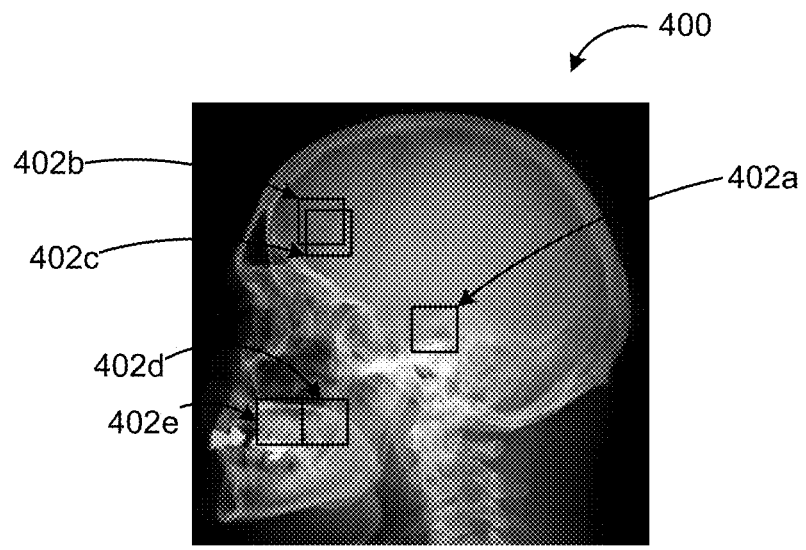
FIG. 4A is an example image for processing by the systems described herein.
Figure 4B:
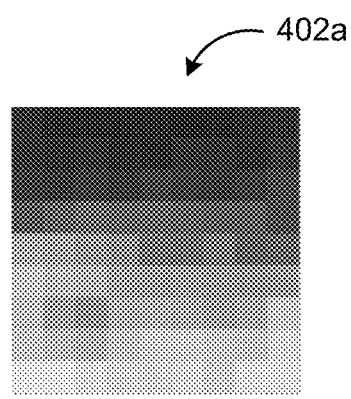
FIG. 4B is an example image portion of the image of FIG. 4A.

The processor 112 can divide an image, such as example image 400 in FIG. 4A, into image portions 402. Example image portions 402*a* to 402*e* are shown in FIG. 4A. Image portion 402*a* is shown in FIG. 4B. In some embodiments, an image portion 402 can overlap with a neighboring image portion. That is, an image portion can include the same pixels as another image portion of the image 400. For example, in FIG. 4A, image portions 402*b* and 402*c* overlap each other. A stride between overlapping image portions refers to the shift in position between overlapping image portions or non-overlapping pixels between overlapping image portions. Overlapping image portions can have a single pixel stride, or a two pixel stride, or any other appropriate stride value that is less than the dimensions of the image portion.

In some embodiments, the image portions do not overlap. That is, each portion includes different pixels of the image 400. Image portions 402*d* and 402*e* are example image portions that do not overlap.

The image portions 402 shown in FIG. 4A are square in shape. It is possible for the image portions 402 to have different shapes. For example, an image portion can have a shape that is a rectangle, triangle, trapezoid, circle, oval, or any other appropriate closed planar figure. Each image portion 402 of an image 400 has substantially the same shape.

In addition, a dimension of the image portions 402 can be varied with the applications of the image management system 110, according to user definitions and/or other factors associated with the encoding of the images. For example, the dimension of the image portion 402 can be defined according to a type of image analysis to be implemented and/or a type of image. For example, a dimension of the image portion 402 can be ten pixels by ten pixels (10×10) or any other appropriate dimensions. The dimension of an image portion 402 can be smaller than the dimension of patches within the image.

The size of the image portion 402 can be selected based on a maximum integer to be used for the encoded representation. For example, if the maximum integer is 256, a binary representation, such as 710 and 720 shown in FIGS. 9B and 9C, require 8 bits. In some embodiments, additional bits may be included to represent other characteristics of the image portion 402. In some embodiments, each image portion 402 of an image 400 can be characterized by substantially similar dimensions.

For each image portion 402, the processor 112 can generate a set of projection data. The processor 112 can generate projection data by applying a transform to the image portion 402. The projection data extracts data related to image features from the intensity values and the data structure of the image portion 402. The projection data can also include compressed image information contained within the intensity values and the data structure of the image portion. The nature of the extracted features and/or compressed information can vary with the transform used to generate the transform values. Example transforms include, but is not limited to, Fourier, wavelet, cosine, Haar, Gabor, and Radon transforms. Depending on the analysis to be applied to the image, a different transform may be appropriate. For example, the Gabor transform can generate a more detailed set of projection data than the Radon transform but the Gabor transform can be more computationally intensive.

Figure 5A:
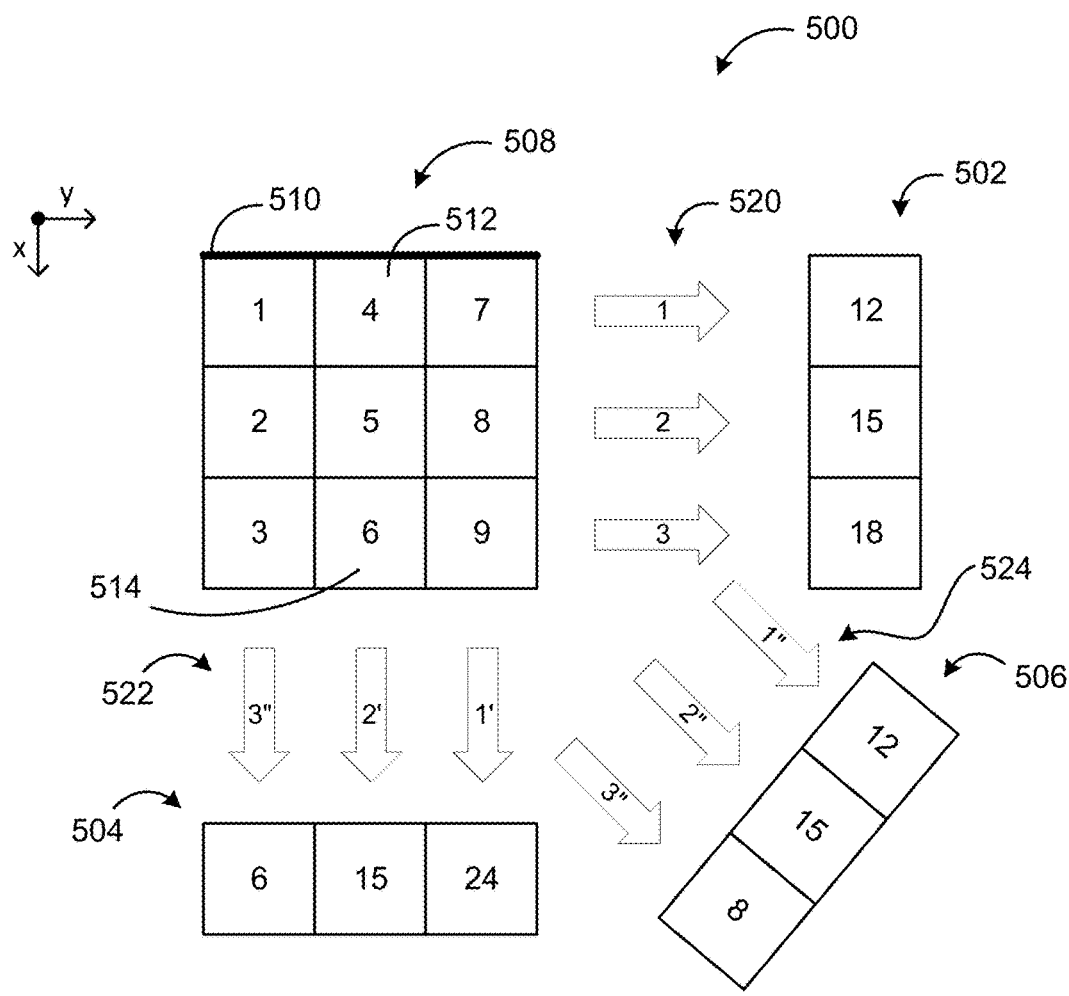
FIG. 5A is a schematic illustrating an example Radon transform applied to an image portion.

Referring now to FIG. 5A, shown therein is a schematic 500 illustrating application of a Radon transform as applied to an image portion. In the schematic 500, a data structure 508 representing the image portion is shown. The data structure 508 is a form of representing features of the image portion. In the example shown in FIG. 5A, the data structure 508 illustrates the intensity values at the respective pixel position in the image portion.

The data structure 508 in this example has a dimension of three pixels by three pixels (3×3). The data structure 508 in this example is in the form of a grid and each cell corresponds to a respective pixel position in the image portion. In this example, each pixel position can be identified by a position coordinate (x, y), where x represents a row and y represents a column. For example, pixel position (1, 2) 512 has an intensity value of 4 and pixel position (3, 2) 514 has an intensity value of 6. Other forms of representing the pixel position can be similarly used.

Radon transform, R(ρ, θ), can generate projection data for an image, or image portion. The Radon transform includes capturing data in respect of the image using parallel projection lines that are applied at positions ρ and at an angle θ with respect to a reference edge of the image. The captured data is then integrated. That is, the Radon transform operates to sum image data at pixel positions along each projection line.

Referring still to FIG. 5A, as shown generally at 520, 522 and 524 are example sets of projection lines. The set of projection lines 520 (e.g., lines 1, 2, 3) are applied to the image at an angle of 0° relative to a reference edge 510, the set of projection lines 522 (e.g., lines 1', 2', 3') are applied to the image at an angle of 90° relative to the reference edge 510, and the set of projection lines 524 (e.g., lines 1", 2", 3") are applied to the image at an angle of 45° relative to the reference edge 510. The processor 112 can generate the projection data 502 based on the image data collected along the set of projection lines 520, the projection data 504 based on the image data collected along the set of projection lines 522, and the projection data 506 based on the image data collected along the set of projection lines 524.

The projection data 502, 504, and 506 can be generally referred to as a set of projection data 530. The set of projection data 530 includes a subset of projection data 502, 504 and 506 that is associated with a corresponding set of projection lines 520, 524 and 522. Each set of projection data 530 contains extracted and compressed image information. In this example, the Radon transform of each set of projection lines generated corresponding three values, with each value representing a sum of the intensity along a projection line at each respective position ρ and at the angle θ relative to the reference edge 510. The magnitude and position of each value in each Radon projection captures spatial information about the content of the raw digital image. As shown in FIG. 5A, the values returned from the Radon transform of the subsets of projection data 502, 504, and 506 range from 6 to 24.

Figure 5B:
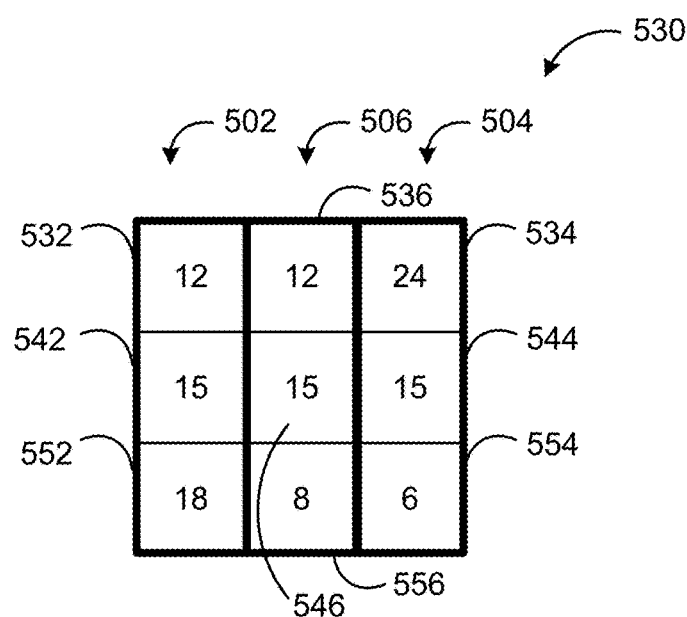
FIG. 5B is a schematic illustrating a set of projection data for the image portion of FIG. 5A, in accordance with an example embodiment.

The set of projection data 530 is illustrated in FIG. 5B in an example configuration. As shown, the subset of projection data 502 is based on the data collected with the set of projection lines 520 applied at an angle of 0° relative to the reference edge 510, the set of projection data 506 is based on the data collected with the set of projection lines 524 applied at an angle of 45° relative to the reference edge 510, and the set of projection data 504 is based on the data collected with the set of projection lines 522 applied at an angle of 90° relative to the reference edge 510. Each subset of projection data 502, 506, 504 includes an intensity value for each projection line of the corresponding set of projection lines 520, 524, 522.

A Radon transformation can be applied to an image or image portion by applying a set of projection lines along a direction with respect to a reference edge of the image. Example directions can include 0° to 180° with respect to the reference edge of the image.

Figure 6A:
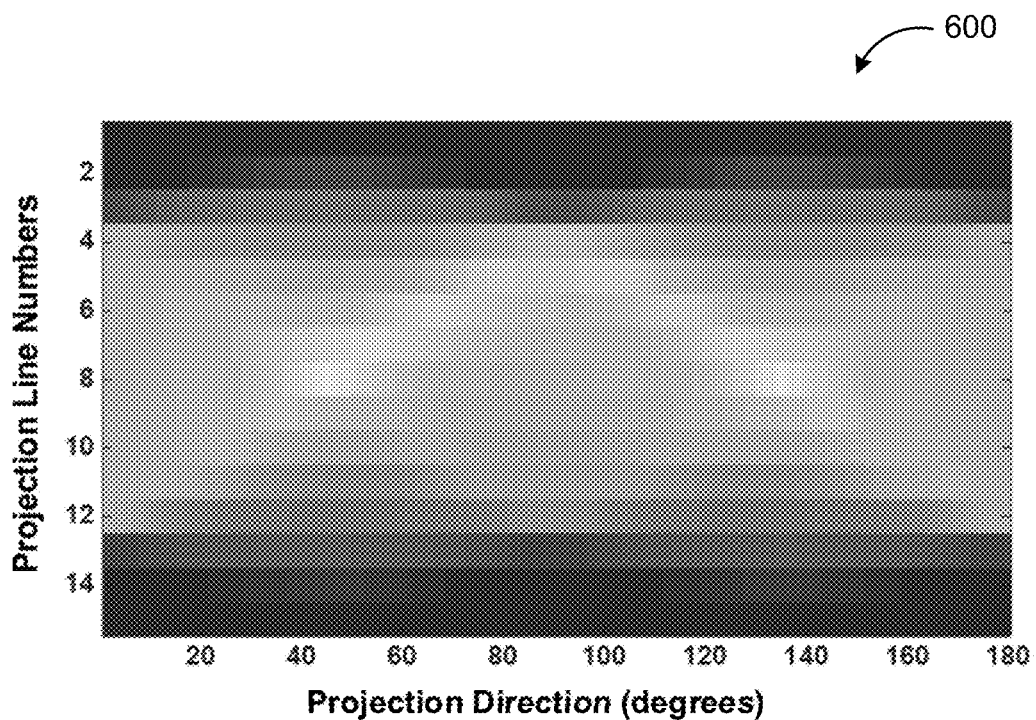
FIG. 6A is an example sinogram for the image portion of FIG. 4B.

Referring now to FIG. 6A, which is an example sinogram 600 for the image portion 402 shown in FIG. 4B. The sinogram 600 illustrates the sets of projection data representing the image intensity at each pixel of the image portion 402 after applying a Radon transformation to the image portion 402. The sinogram 600 includes the sets of projection data generated by applying a set of 15 projection lines along projection directions from 0° to 180° with respect to a reference edge of the image portion 402. The sinogram 600 is an example graphical representation of the sets of projection data but is not required to be generated for the methods and systems disclosed herein. It should also be understood that if illustrating the sets of projection data is necessary, other forms of illustrating the sets of projection data can be used.

Referring again to FIG. 2, at 204, for the at least one image portion of the image, the processor 112 identifies a subset of projection data 502, 504, 506 from the set of projection data 530 associated with one or more dominant features. Each set of projection data 530 includes a subset of projection data 502, 504, 506 for each projection direction.

A dominant feature represents a distinguishing characteristic of the set of projection data 530. For example, the dominant feature can correspond to a maximum amplitude, that is, the greatest value, or the highest peak, in the set of projection data 530, a highest total intensity value along a specific projection direction, or a maximum gradient, or greatest variance, within the set of projection data 530.

In the example shown in FIG. 5B, for example, a highest intensity value (e.g., maximum amplitude) at the projection direction 0° is "18" (see cell 552), a highest intensity value at the projection direction 45° is "15" (see cell 546), and a highest intensity value at the projection direction 90° is "24" (see cell 534). The processor 112 can then determine from the set of projection data 530 that the overall highest intensity value is "24" (see cell 534), which is present at the projection direction, 90°. The processor 112 can then assign the projection direction 90° as a principal projection direction. In another example embodiment, the processor 112 can then assign the principal projection direction to a projection angle (θ*) with a highest total intensity value. For example, referring again to FIG. 5B, the total intensity value along the projection direction 0° is "45" (total of the intensity values at cells 532, 542, 552), a total intensity value at the projection direction 45° is "35" (total of the intensity values at cells 536, 546, 556), and a total intensity value at the projection direction 90° is "45" (total of the intensity values at cells 534, 544, and 554). The processor 112 can then determine from the set of projection data 530 that the highest total intensity value is "45", which is associated with the projection directions, 0° and 90°. The processor 112 can then assign at least one of the projection directions 0° and 90° as the principal projection direction. In some embodiments, the processor can assign both projection directions 0° and 90° as the principal projection direction.

When determining the dominant feature based on a highest total intensity value, the processor 112 can identify from the set of projection data 530 a projection angle (θ*), or projection direction, associated with a highest total intensity value using Equation (1) below.

$$\theta^* = \underset{i}{\operatorname{argmax}} \max[R(\rho_1, \theta_i), \ldots, R(\rho_{|p|}, \theta_i)] \quad (1)$$

where $R(\rho_1, \theta_i)$ is the projection vector of size n; p' is a derivative of p given by $$p' = \frac{\partial}{\partial \rho} p;$$

and b is the projection vector of size i, $\forall i \in \{1, 2, \ldots, n-1\}$.

The processor 112 can then assign the projection angle (θ*) at which the dominant feature is present as a principal projection direction.

Figure 6B:
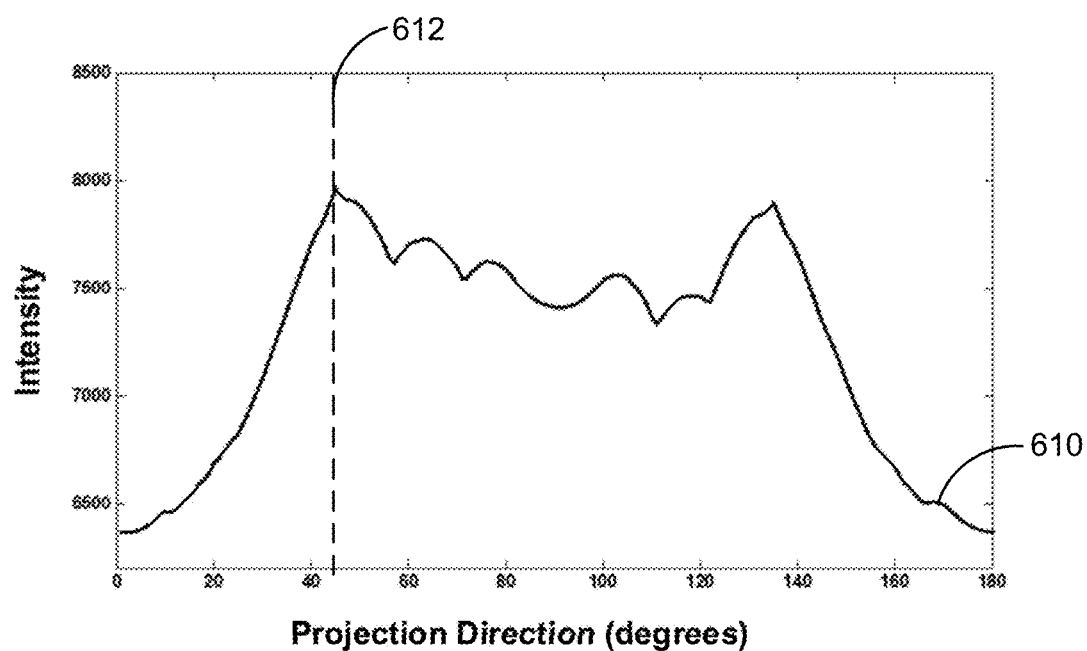
FIG. 6B is a graph of the total intensity values of the projection data at various projection directions for the image portion of FIG. 4B.

FIG. 6B is a graph 610 of a total intensity value at each projection direction shown in FIG. 6A. The processor 112 can determine that the highest total intensity value is at 45° (shown generally at 612). The processor 112 can select the projection direction at 45° as the principal projection direction 612. The graph 610 is an example representation of the total intensity values but is not required to be generated for the methods and systems disclosed herein. It should also be understood that if illustrating the total intensity values is necessary, other forms of illustrating the maximum amplitude values can be used.

In some embodiments, the processor 112 can select multiple projection directions as the principal projection directions 612. For example, multiple projection directions can be associated with the same highest total intensity value, or multiple projection directions are associated with a total intensity value that exceeds a predefined dominant feature threshold.

The processor 112 can then select the supplemental projection directions with respect to the principal projection direction 612. The supplemental projection directions can have a fixed relationship with the principal projection direction 612. The number of supplemental projections can affect the accuracy in which the encoded representation of the image portion 402 represents the image portion 402. For example, the processor 112 can select three supplemental projection directions to be selected with respect to the principal projection direction 612. The principal projection direction 612 can be represented by θ* and the processor 112 can select the three supplemental projection directions to be at θ*+45°, θ*+90°, and θ*+135°, respectively. With the four projection directions (e.g., θ*, θ*+45°, θ*+90°, and θ*+135°), the processor 112 can generate the encoded representation of the image portion 402 based on sets of projection data from four different views of the image portion 402. By increasing the number of projection directions used, there will be an increase in the amount of projection data, which can increase the quality of the encoded representation but will also increase the computation resources required to generate the encoded representation and the storage resources necessary for storing the resulting encoded representation.

The number of projection directions selected by the processor 112 can vary with different factors, such as, but not limited to, the type of image, user specification, availability of resources and/or the type of available resources.

In some embodiments, the principal projection direction 612 and the supplemental projection directions can be equidistant. For example, when the processor 112 operates to select five supplemental projection directions, the processor 112 can select the projection directions at θ*+30°, θ*+60°, θ*+90°, θ*+120°, and θ*+150°. The angular separation between adjacent projection directions can be substantially equal.

FIGS. 7A to 7D are graphs showing the subsets of projection data associated with the respective projection direction. The subsets of projection data shown in FIGS. 7A to 7D relate to the image portion 402 and the graph 610. The horizontal axes of FIGS. 7A to 7D is the projection line number and the vertical axes of FIGS. 7A to 7D is the intensity value of the subsets of the projection data.

FIG. 7A shows the subset of projection data 620a associated with the principal projection direction (θ*) 612 as shown in FIG. 6B. FIG. 7B shows the subset of projection data 620b associated with a first supplemental projection direction (θ*+90°), FIG. 7C shows the subset of projection data 620c associated with a second supplemental projection direction (θ*+135°), and FIG. 7D shows the subset of projection data 620d associated with a third supplemental projection direction (θ*+180°). The graphs shown in FIGS. 7A to 7D are example representations but are not required to be generated for the methods and systems disclosed herein. It should also be understood that if illustrating the subsets of projection data 620a, 620b, 620c and 620d is necessary, other forms of illustrating the subsets of projection data 620a, 620b, 620c and 620d can be used.

Continuing with FIG. 2, at 206, the processor 112 generates the encoded representation based at least on a data variation within the subset of projection data 620a, 620b, 620c, 620d for the image portion 402.

To represent the data variation within the subset of projection data 620a, 620b, 620c, 620d of the principal projection direction 612 and the supplemental projection directions, a derivative of each subset of projection data 620a, 620b, 620c, 620d can be determined with respect to the projection line numbers. The derivative can be the difference in value of the projection data across the projection lines.

For example, returning to FIG. 5B, for projection data 502, the variation from the amplitude value at projection line 1 (see cell 532) to the amplitude value at projection line 2 (see cell 542) is an increase of a value of three, and the variation from the amplitude value at projection line 2 (see cell 542) to the amplitude value at projection line 3 (see cell 552) is increase of a value of three. For projection data 506, the variation from the amplitude value at projection line 1' (see cell 536) to the amplitude value at projection line 2' (see cell 546) is an increase of a value of three and the variation from the amplitude value at projection line 2' (see cell 546) to the amplitude value at projection line 3' (see cell 556) is a decrease of a value of seven. For projection data 504, the variation from the amplitude value at projection line 1" (see cell 534) to the amplitude value at projection line 2" (see cell 544) is a decrease of a value of nine and the variation from the amplitude value at projection line 2" (see cell 544) to the amplitude value at projection line 3" (see cell 554) is decrease of a value of nine. While not shown for the set of projection data 530, the derivative values (herein referred to as 630) of the subset of projection data 620 associated with one or more dominant features can be visually illustrated in a graph.

FIGS. 8A to 8D are graphs showing the derivative values for the respective subsets of projection data 620a, 620b, 620c, 620d. The horizontal axes of FIGS. 8A to 8D is the projection line number and the vertical axes of FIGS. 8A to 8D is the derivative values of the sets of projection data 620a, 620b, 620c, 620d.

FIG. 8A illustrates the derivative values 630a of the projection data 620a at the principal projection direction (θ*), FIG. 8B illustrates the derivative values 630b of the projection data 620b at the first supplemental projection direction (θ*+90°), FIG. 8C illustrates the derivative values 630c at the second supplemental projection direction (θ*+135°), and FIG. 8D illustrates the derivative values 630d at a third supplemental projection direction (θ*+180°). The graphs shown in FIGS. 8A to 8D are example representations but are not required to be generated for the methods and systems disclosed herein. It should also be understood that if illustrating the derivative values 630a, 630b, 630c and 630d is necessary, other forms of illustrating the derivative values 630a, 630b, 630c and 630d can be used.

The derivative values 630 illustrated in FIGS. 8A to 8D can be encoded in binary form, in some embodiments. For example, the processor 112 can generate a binary vector for each set of derivative values 630a, 630b, 630c, 630d. In some embodiments, the processor 112 can determine a data variation within each set of derivative values 630a, 630b, 630c, 630d by comparing sequential derivative values.

In some embodiments, the processor 112 can encode the sets of derivative values 630a, 630b, 630c, 630d in binary form by applying the below Equation (2).

$$b(i) = \begin{cases} 1 & \text{if } p'(i+1) > p'(i), \\ 0 & \text{otherwise} \end{cases} \quad (2)$$

where p is the projection vector of size n;
p' is a derivative of p given by $$p' = \frac{\partial}{\partial \rho} p;$$

and b is the binary encoding of size i, $\forall i \in \{1, 2, \ldots, n-1\}$.

According to Equation (2), the processor 112 can assign bit "1" when a subsequent derivative value increases and bit "0" when the subsequent derivative value decreases. Other representations of the data variation in the derivative values, even outside of binary representations, may be applied. In some embodiments, the processor 112 can instead assign bit "0" to represent an increase in a subsequent derivative value and a bit "1" to represent a decrease in the subsequent derivative value.

Figure 9A:
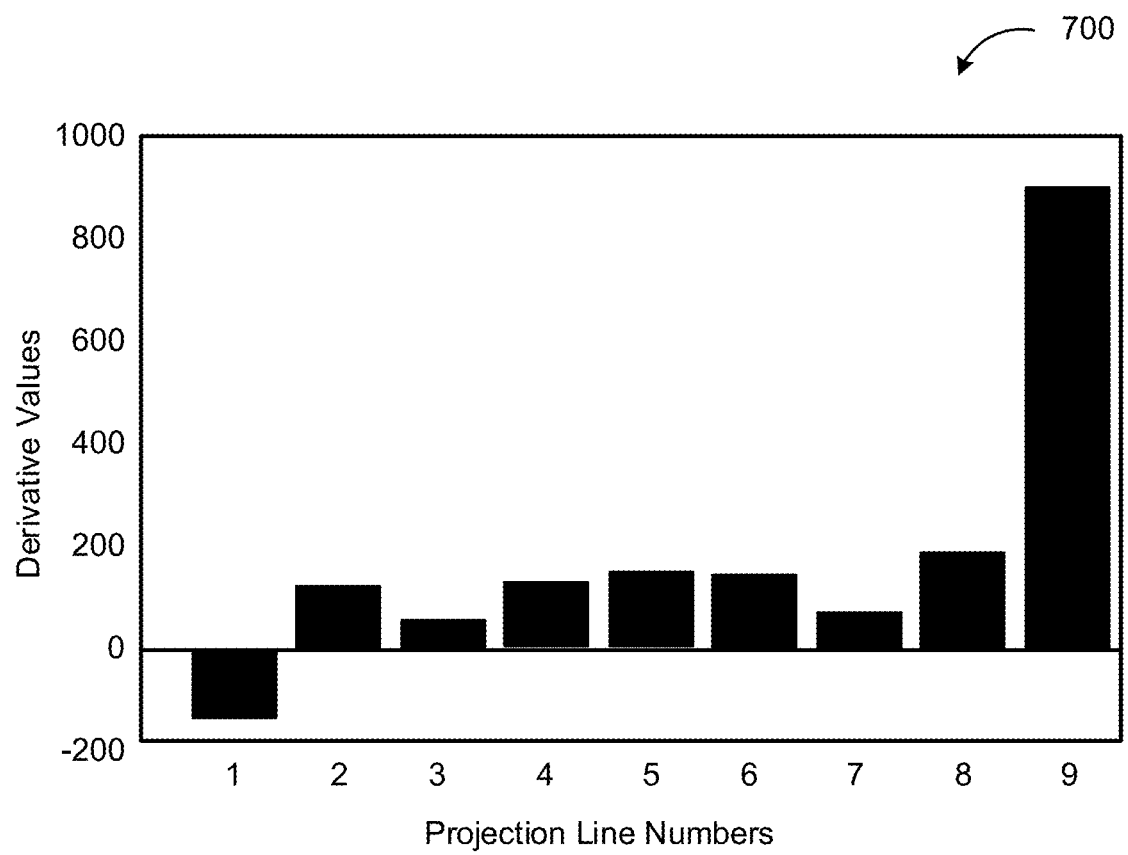
FIG. 9A is a graph of a derivative of an example set of projection data associated with an image, in accordance with an example embodiment.
Figure 9B:
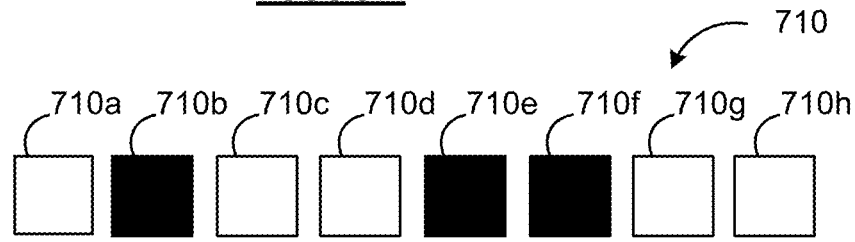
FIG. 9B is a schematic representation of an example encoded representation associated with FIG. 9A.
Figure 9C:
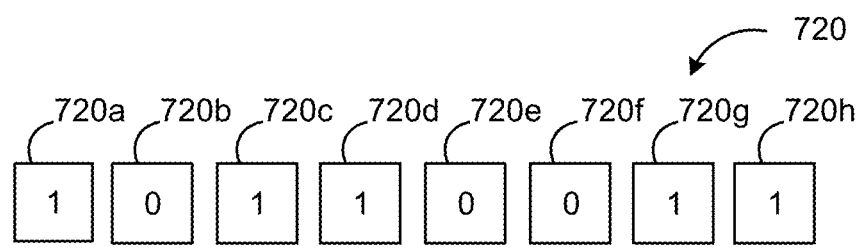
FIG. 9C is a schematic representation of another example encoded representation associated with FIG. 9A.

To illustrate the binary encoding of the derivative values, FIG. 9A is a graph of an example set of derivative values 700. The horizontal axis represents the projection line numbers and the vertical axis represents the derivative intensity values. FIG. 9B shows an example schematic 710 representative of an encoded representation of the derivative values of FIG. 9A. The schematic 710 can be generated as a barcode or other optically readable pattern. FIG. 9C shows another example schematic 720 representative of the encoded representation of the derivative values of FIG. 9A.

As can be seen in FIG. 9A, the difference from the derivative value at projection line 1 to the derivative value at projection line 2 is an increase. This increase is represented by the processor 112 in FIG. 9B with an empty cell 710a and in FIG. 9C with the bit "1" 720a. The difference from the derivative value at projection line 2 to the derivative value at projection line 3 is a decrease. This decrease is represented by the processor 112 in FIG. 9B with a filled cell 710b and in FIG. 9O with the bit "0" 720b.

The difference from the derivative value at projection line 3 to the derivative value at projection line 4 is an increase. This increase is represented by the processor 112 in FIG. 9B with an empty cell 710c and in FIG. 9C with the bit "1" 720c. Similarly, since the difference between the derivative value at projection line 4 and projection line 5 is an increase, the increase is represented by the processor 112 in FIG. 9B with an empty cell 710d and in FIG. 9C with the bit "1" 720d.

The difference from the derivative value at projection line 5 to the derivative value at projection line 6 is a decrease, and the difference from the derivative value at projection line 6 to the derivative value at projection line 7 is also a decrease. These decreases are represented by the processor 112 in FIG. 9B with filled cells 710e, 710f and in FIG. 9C with the bit "0" 720e, 720f.

The difference from the derivative value at projection line 7 to the derivative value at projection line 8 is an increase, and the difference from the derivative value at projection line 8 to the derivative value at projection line 9 is also an increase. These increases are represented by the processor 112 in FIG. 9B with empty cells 710g, 710h and in FIG. 9C with the bit "1" 720g, 720h.

In some embodiments, the binary representations 710, 720 can be converted into integer values by the processor 112. The binary representations 710, 720 can represent the integer value 179.

Figure 10:
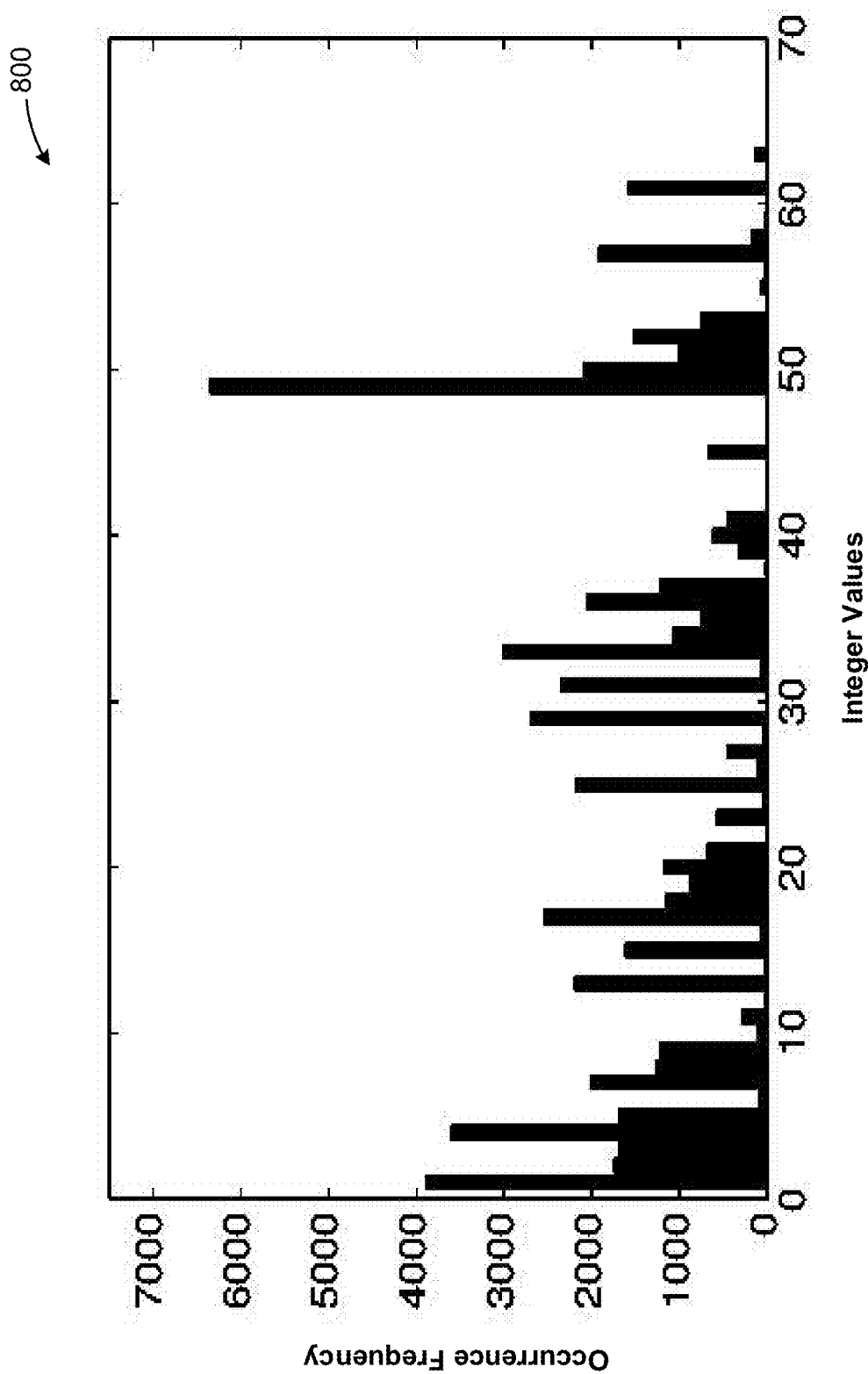
FIG. 10 is a histogram of integer values representing the image portion of FIG. 4B.

For example, the processor 112 can determine an occurrence frequency of the integer values converted from the binary representations 710, 720 and generate an encoded representation for the image portion 402 based on the occurrence frequency. The occurrence frequency of each integer value can, in some embodiments, be illustrated in a histogram. FIG. 10 shows an example occurrence frequency histogram 800. In some embodiments, the processor 112 can generate a histogram for the sets of projection data associated with the principal projection direction 612 and the supplemental projection directions for all image portions of an image. This histogram may be referred to as a merged histogram. In some embodiments, the processor 112 can generate a histogram that represents the set of projection data associated with the principal projection direction for all image portions and a histogram for each supplemental projection direction for all of the image portions. Each of these histograms can be referred to as a detached histogram.

The processor 112 can encode the occurrence frequencies of the integer values. The processor 112 can encode the occurrence frequency based on method described with respect to Equation (2), for example.

When the processor 112 generates encoded representations based on detached histograms, the processor 112 can place the detached histograms in end-to-end relation with one another. Thus, encoded representations based on detached histogram have more bits to carry information and encoded representations based on merged histograms are shorter and thus, have fewer bits to carry information.

Figure 11A:
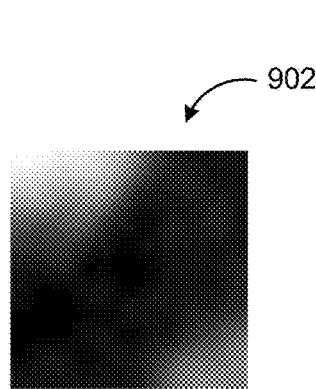
FIG. 11A is another example image portion.
Figure 11B:
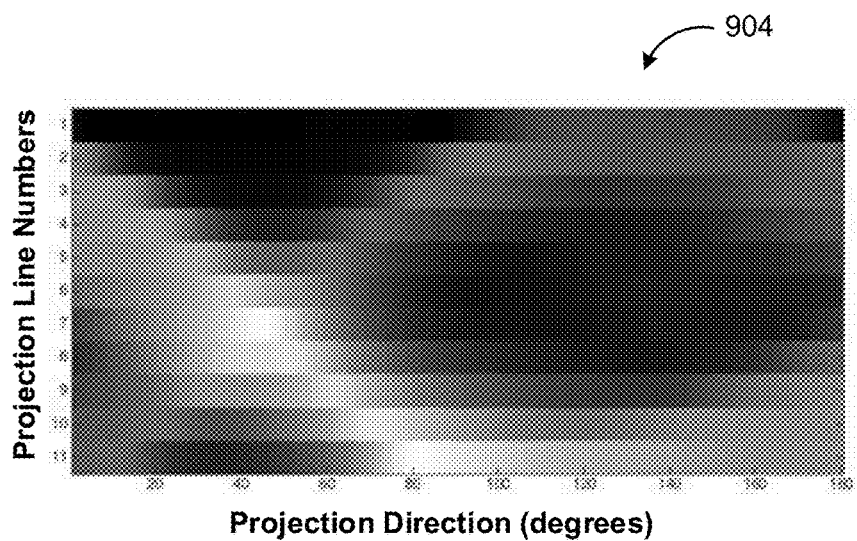
FIG. 11B is an example sinogram for the image portion shown in FIG. 11A.
Figure 11C:
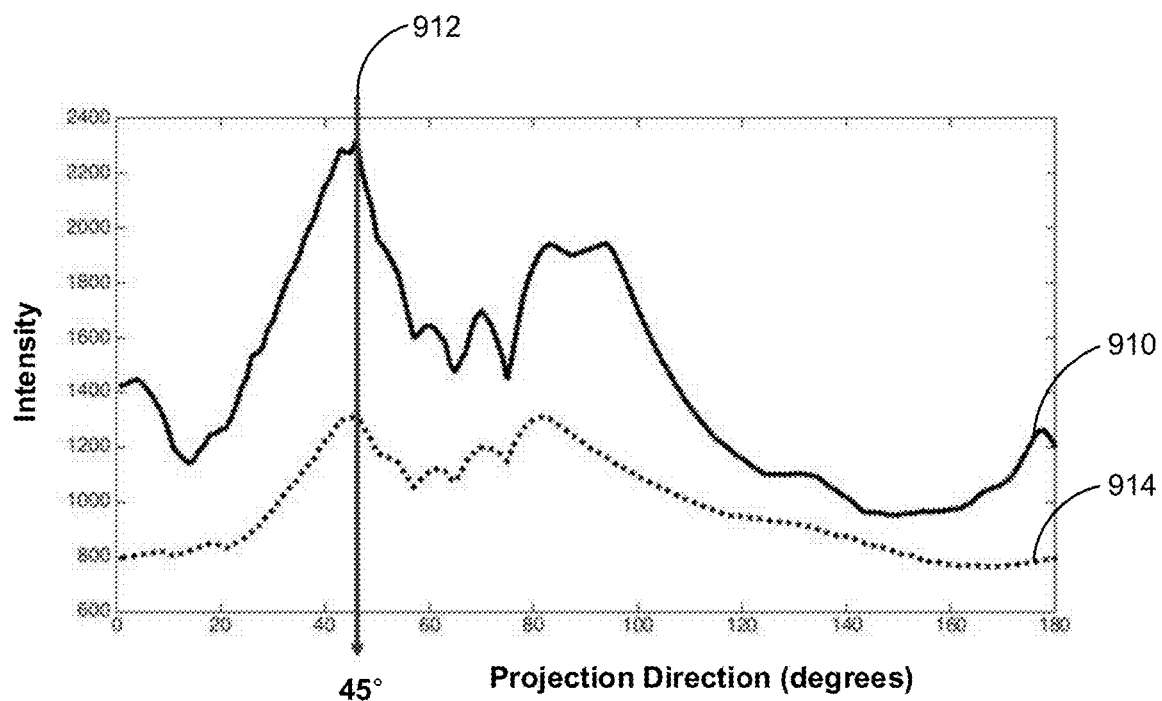
FIG. 11C is a graph of total intensity values and gradient values at various projection directions for the image portion of FIG. 11A.
Figures 13A, 13B, 13C:
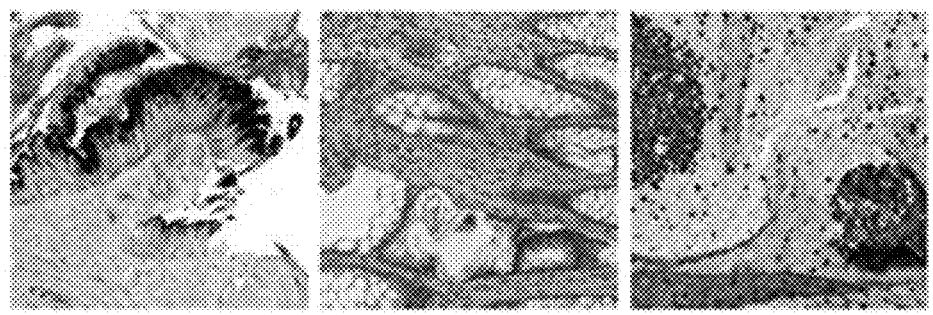
FIG. 13A is an example patch from an example dataset.
FIG. 13B is another example patch from the same example dataset shown in FIG. 13A.
FIG. 13C is another example patch from the same example dataset shown in FIG. 13A.
Figures 13D, 13E, 13F:
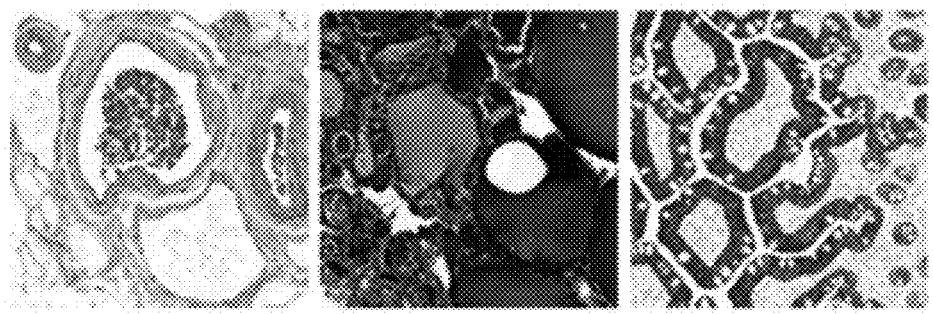
FIG. 13D is another example patch from the same example dataset shown in FIG. 13A.
FIG. 13E is another example patch from the same example dataset shown in FIG. 13A.
FIG. 13F is another example patch from the same example dataset shown in FIG. 13A.

Reference will now be made to FIGS. 11A to 11C. As described with reference to at least FIGS. 5A to 8D, the processor 112 can generate an encoded representation of the image portion 402 based on the amplitude values of the image intensity. In some embodiments, as will be described with reference to FIGS. 11A to 11C, the processor 112 can generate an encoded representation of the image portion 402 based on the gradient values.

FIG. 11A shows an example image portion 902. The processor 112 generated a set of projection data 904 for the image portion 902 using the methods described herein. FIG. 11B is a sinogram illustrating the set of projection data 904 for the image portion 902 of FIG. 11A. The sinogram represents the image intensity information of image portion 902 obtained from Radon transformations involving 11 projection lines applied at projection directions from 0° to 180°.

FIG. 11C is a graph illustrating the maximum amplitude 910 at each projection direction in the set of projection data 904. The processor 112 can determine that the projection direction associated with the dominant feature (e.g., maximum amplitude) is approximately 45°. The processor 112 can assign this projection direction as the principal projection direction 912.

FIG. 11C also shows a graph illustrating the maximum gradient 914 at each projection direction in the set of projection data 904. In some embodiments, the processor 112 can determine the principal projection direction 912 based on a dominant feature related to a maximum gradient with the set of projection data 904. For example, the processor 112 can determine the maximum gradient using Equation (3) below.

$$\theta^* = \underset{i}{\operatorname{argmax}} \int_j \frac{\partial R(\rho_j, \theta_i)}{\partial \rho} \quad (3)$$

where $$\frac{\partial R(\rho_j, \theta_i)}{\partial \rho}$$

is the gradient across parallel lines $\rho_i$.

As can be seen in FIG. 11C, the processor 112 can determine that the projection direction associated with the maximum gradient is approximately 45° and can assign this projection direction as the principal projection direction 912. In this illustrated example, the maximum gradient and the maximum amplitude correspond to the same projection direction but in other examples, it is possible that the maximum gradient and the maximum amplitude can be associated with different projection directions. The selection of the principal projection direction 912 can vary with various factors, such as, but not limited to, the image type, the amount of computational resources available and the type of resources available. For example, the computational resources required for determining the maximum gradient can be more demanding than the computational resources required for determining the maximum amplitude. As a result, the amount of time required by the image management system 110 to generate the encoded representation using the maximum gradient can be longer than with the maximum amplitude.

In some embodiments, the processor 112 can determine the principal projection direction 912 based on a dominant feature related to a greatest variance within the set of projection data 904. For example, returning to FIG. 5B, for projection data 502, the greatest variance along the projection direction 0° occurs between projection line 1 (see cell 532) and projection line 3 (see cell 552), which is an increase of an intensity value of six, and the greatest variance along the projection direction 45° occurs between projection line 2' (see cell 546) and projection line 3' (see cell 556), which is a decrease of an intensity value of seven, and the greatest variance along the projection direction 90° occurs between projection line 1" (see cell 534) and projection line 3" (see cell 554), which is a decrease of an intensity value of 18. The processor 112 can then determine from the set of projection data 530 that the greatest variance is along the projection direction 90°. The processor 112 can then assign the projection direction 90° as the principal projection direction. In some embodiments, the processor 112 may determine the greatest variance only based on the variance between adjacent intensity values.

Figure 3A:
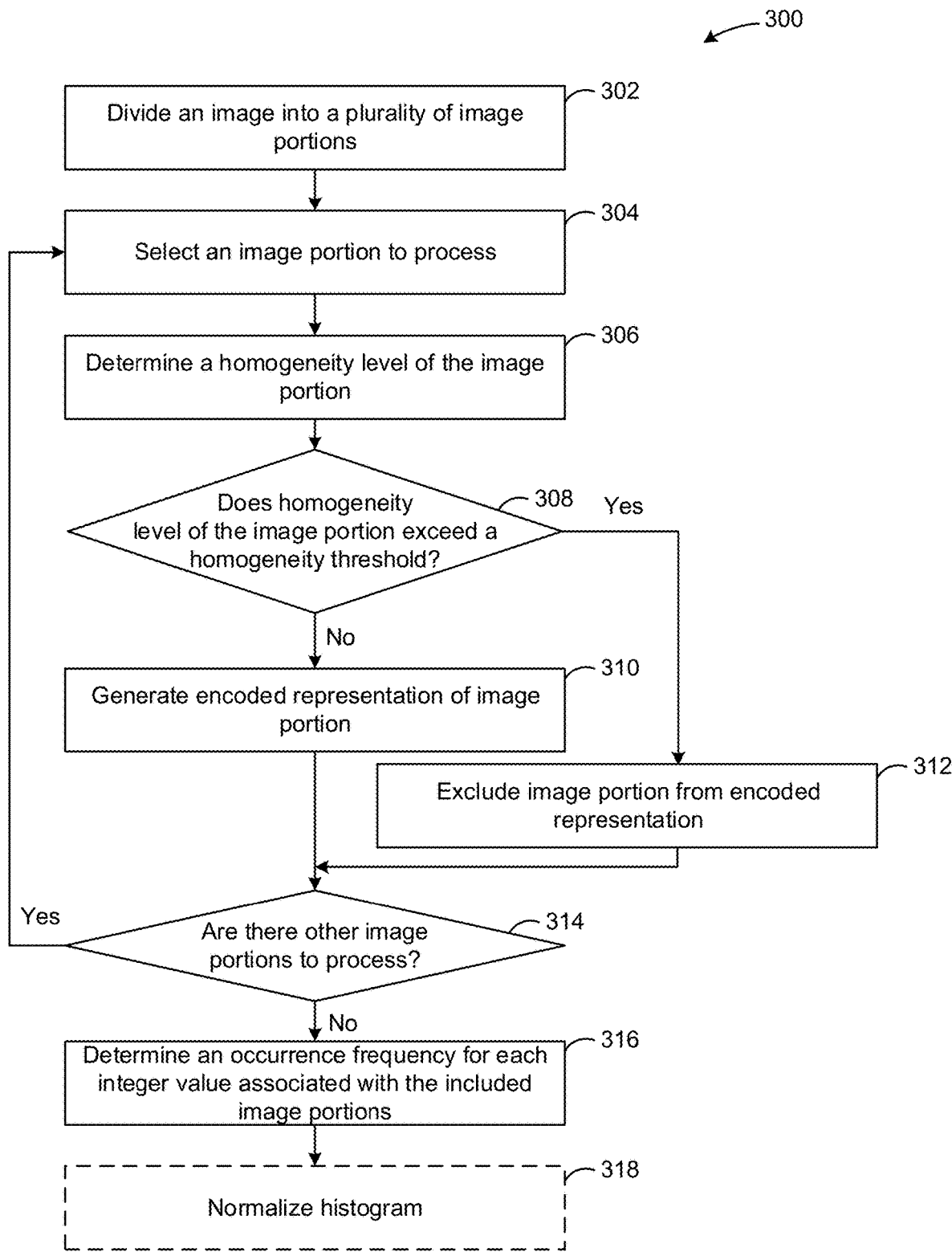
FIG. 3A is a flowchart of another example method for generating an encoded representation of an image.

Referring now to FIG. 3A, which is a flowchart diagram 300 of another example method for generating an encoded representation of the image 400. The image 400 can be received from the imaging device 120, the computing device 150, or the system storage component 140.

At 302, the processor 112 can divide the image 400 into a plurality of image portions 402. In some embodiments, 302 can involve determining dimensions for the image portions 402 and if the image 400 includes more than one image portion 402, a stride between image portions 402.

At 304, the processor 112 can select an image portion 402 to process.

At 306, the processor 112 can determine a homogeneity level of the image portion 402. The homogeneity level indicates how similar the image data is within the image portion 402. As described herein, the principal projection direction is associated with one or more dominant features and so, the processor 112 operates to select the projection direction that is associated with distinguishing characteristics. When the image portion 402, as a whole, is generally consistent in intensity, the resulting encoded representation generated by the processor 112 may not be representative of the overall image. Accordingly, the image management system 110 disclosed herein may exclude image portions 402 associated with a certain homogeneity level.

In some embodiments, the image portion 402 can be pre-processed to determine whether it contains information relevant for generating an encoded representation. Equation (4) below can be used to determine a homogeneity level of the intensity variation within an image portion.

$$H = 1 - \frac{1}{2^{n \text{ bits}}} \sqrt{\sum_i \sum_j (W_{ij} - m)^2} \quad (4)$$

where m is the median;
$W_{ij}$ is the image portion; and
$n_{bits}$ is the number of bits used to encode the image.

At 308, the processor 112 compares the homogeneity level determined at 306 with a homogeneity threshold. The homogeneity threshold represents a maximum amount of homogeneity in the intensity of an image portion 402 for that image portion 402 to be included in the encoded representation. An example range of the homogeneity threshold can be 80% to 95%, for example. Other ranges of the homogeneity threshold can be applied depending on the application of the image management system 110. When the processor 112 determines that the homogeneity level for the image portion 402 exceeds the homogeneity threshold, the processor 112 will exclude that image portion 402 from the encoded representation.

If at 308 the processor 112 determines that the homogeneity level exceeds the homogeneity threshold, the processor 112 proceeds to 312. At 312, the processor 112 excludes the image portion 402 from the encoded representation. By excluding image portions associated with a high homogeneity level, the resulting encoded representation can more clearly represent the dominant features within the image. As well, fewer image portions 402 require processing by the processor 112 and therefore, the overall time needed to generate the encoded representation can be reduced.

After 312, the processor 112 proceeds to 314. At 314, the processor can determine if there are remaining image portions 402 of the image 400 that require processing. If there are remaining image portions to process, the processor 112 can identify a subsequent image portion 402. In some embodiments, identifying the next image portion can be based on the stride between image portions.

If at 308 the processor 112 determines the homogeneity level does not exceed the homogeneity threshold, the processor 112 can include the image portion 402 in the encoded representation of the image 400 and the processor 112 can proceed to 310.

At 310, the processor 112 can generate an encoded representation of the image portion 402 based on the methods described herein.

After 310, the processor 112 can proceed to 314. If the processor 112 determines at 314 that there are no remaining image portions 402 to process, the processor 112 can proceed to 316.

At 316, the processor 112 can determine an occurrence frequency for each respective integer value for all image portions 402 of the image 400. The resulting histogram illustrating the occurrence frequencies for the integer values for all image portions 402 of the image 400 can form the encoded representation for the image 400.

In some embodiments, the processor 112 may further normalize the histogram generated at 316 (see optional 318). Normalizing the histogram can ensure that multiple encoded representations of the different image conform to a specified standard so that these encoded representations generated with the methods and systems described herein can act as references to each other. For example, the processor 112 can normalize the histogram by standardizing the axes according to maximum and minimum values for each axis.

Figure 3B:
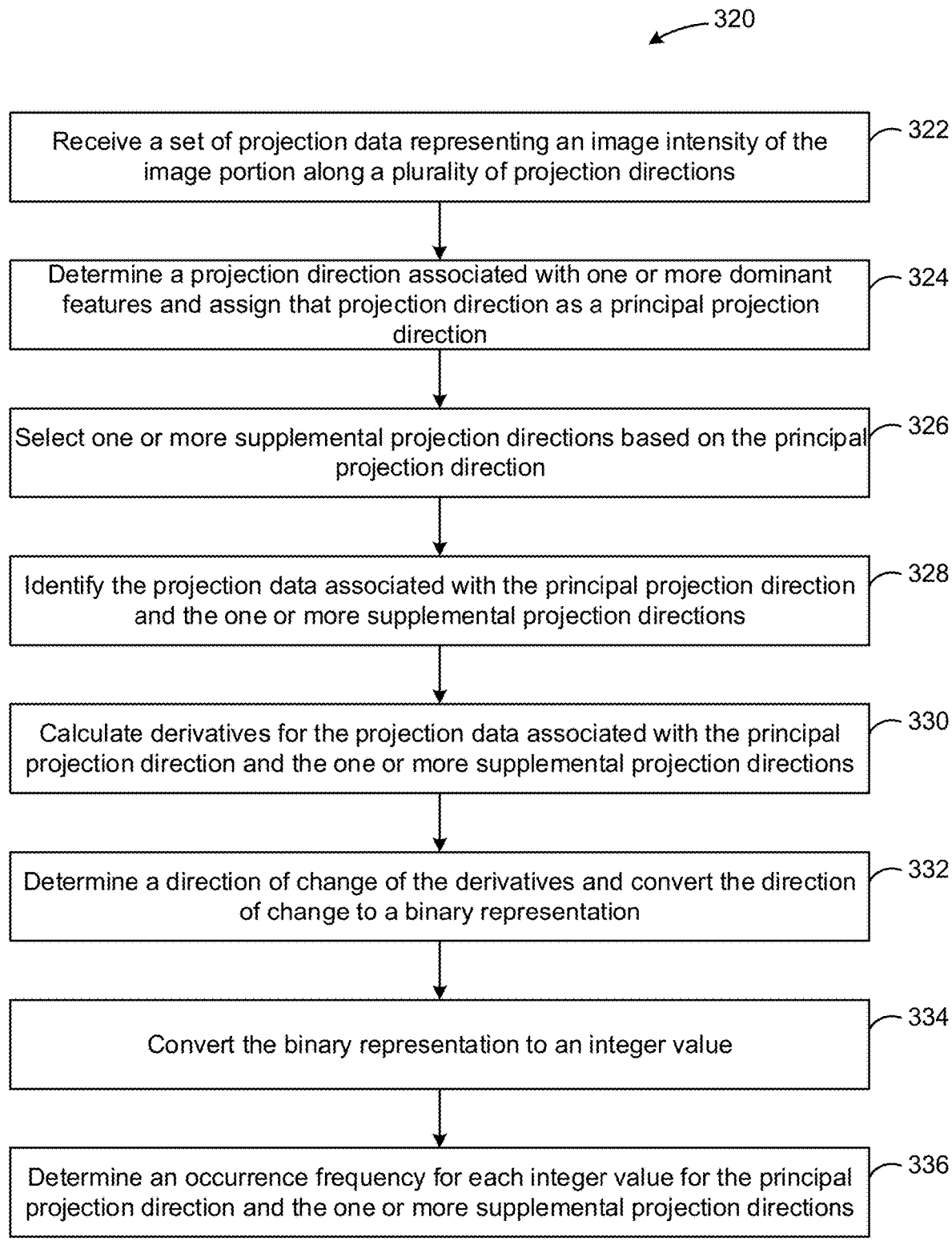
FIG. 3B is a flowchart of an example method for determining an encoded representation for an image portion.

Referring now to FIG. 3B, which is a flowchart 320 of another example method for generating an encoded representation of the image portion 402. The processor 112 can select the image portion 402.

At 322, similar to 202 of FIG. 2, the processor 112 can receive a set of projection data representing the image intensity of the image portion 402 along the plurality of projection directions. The projection data can relate to image features extracted from the intensity values and the data structure of the image portion 402. The processor 112 can apply a transform to the image portion 402 to obtain the set of projection data. For example, the processor 112 can apply a Radon transform, such as 530 of FIG. 5B, 600 of FIG. 6A, and 904 of FIG. 11B.

At 324, the processor 112 can determine a projection direction associated with one or more dominant features. As described above, a dominant feature represents a distinguishing characteristic of the set of projection data. For example, the dominant feature can correspond to, but is not limited to, a maximum amplitude in the set of projection data or a maximum gradient within the set of projection data. The processor 112 can determine the projection direction corresponding to the maximum amplitude, such as 610 of FIG. 6B and 910 of FIG. 11C, or corresponding to the maximum gradient, such as 914 of FIG. 11C. The processor 112 can then assign the projection direction associated with the dominant feature as the principal projection direction.

At 326, the processor 112 can select one or more supplemental projection directions based on the principal projection direction. As described above, the processor 112 can select supplemental projection directions having a fixed relationship with the principal projection direction. In some embodiments, the processor 112 can select supplemental projection directions such that the principal projection direction and the one or more supplemental projection directions are equidistant.

At 328, the processor 112 can identify a subset of projection data associated with the principal projection direction and the one or more supplemental projection directions. Example subsets of projection data 620 associated with the principal projection direction and the supplemental projection directions are shown in FIGS. 7A to 7D.

At 330, the processor 112 can calculate derivatives for the projection data associated with the principal projection direction and the one or more supplemental projection directions. That is, the processor 112 can calculate derivatives for the subsets of projection data associated with the dominant feature. Example derivatives 630 and 700 of the projection data associated with the dominant feature are shown in FIGS. 8A to 8D and 9A, respectively.

At 332, the processor 112 can determine a direction of change in the derivative values and convert the direction of change to a binary representation. The processor 112 can use Equation (2) to encode the direction of change in binary form. For example, the processor 112 can assign a bit "1" when a subsequent derivative value increases and a bit "0" when a subsequent derivative value decreases.

An example binary representation 720 is shown in FIG. 9C. As described above, since the data variation from the derivative value at projection line 1 to the derivative value at projection line 2, the data variation from the derivative value at projection line 3 to the derivative value at projection line 4, the data variation from the derivative value at projection line 4 to the derivative value at projection line 5, the data variation from the derivative value at projection line 7 to the derivative value at projection line 8, and the data variation from the derivative value at projection line 8 to the derivative value at projection line 9 are increases, the processor 112 assigns a bit "1" to cells 720a, 720c, 720d, 720g, and 720h. Since the data variation from the derivative value at projection line 2 to the derivative value at projection line 3, the data variation from the derivative value at projection line 5 to the derivative value at projection line 6, and the data variation from the derivative value at projection line 6 to the derivative value at projection line 7 are decreases, the processor 112 assigns a bit "0" to cells 720b, 720e, and 720f.

At 334, the processor 112 can convert the binary representation to an integer value. As described above, the binary representations 710, 720 can represent the integer value 179.

At 336, the processor 112 can determine an occurrence frequency for each respective integer value for the principal projection direction and the one or more supplemental projection directions. In some embodiments, a merged histogram can illustrate the occurrence frequencies for the integer values for the principal projection direction and the one or more supplemental projection directions. In some embodiments, detached histograms can illustrate the occurrence frequencies for the integer values for the principal projection direction and each of the one or more supplemental projection directions separately.

Referring now to FIG. 12A, shown therein is an example image 1002. FIGS. 12B to 12F show projection data and histograms of image 1002, according to the described methods and systems. FIG. 12B is a merged histogram 1004 of the occurrence frequency of each integer value for all of the principal projection direction and the supplemental projection directions of the described methods for the image 1002. FIG. 12C illustrates the subset of projection data 1012 of the image 1002 at the principal projection direction. FIG. 12D is a detached histogram 1014 of the occurrence frequency of each integer value for the principal projection direction. FIG. 12E illustrates the subset of projection data 1022 of the image 1002 at a supplemental projection direction, in particular, $\theta^*+90°$. FIG. 12F is a detached histogram 1024 of the occurrence frequency of each integer value for that supplemental projection direction ($\theta^*+90°$).

The performance of the described methods and systems were tested using different texture patterns of a publicly available dataset, KIMIA (Knowledge Inference in Medical Image Analysis) Path24, along with existing image descriptors for comparison. FIGS. 13A to 13F show example patches 1030a, 1030b, 1030c, 1030d, 1030e, and 1030f (herein collectively referred to as 1030) extracted from scan images of the KIMIA Path24 dataset. The patches, including patches 1030, were approximately 1000×1000 pixels in size, which corresponds to 0.5 millimeters (mm)×0.5 mm. Encoded representations in accordance with embodiments described herein were generated for 1325 patches extracted from the KIMIA Path24 dataset.

First, the encoded representations were used for image retrieval. The dissimilarity between two histograms were measured and the results are summarized in Table 1 below.

TABLE 1

| Method | {Patch-to-Scan Accuracy, Whole-Scan Accuracy} | Length of Histogram ($\|h\|$) | Number of Sub-Images Processed ($n_{sub\text{-}images}$) |
|---|---|---|---|
| $ELP_{(10,d),\chi^2}$ | {71.16%, 68.05%} | 1024 | 1 × 1 = 1 |
| $ELP_{(10,m),\chi^2}$ | {70.70%, 67.93%} | 256 | 1 × 1 = 1 |
| Pre-trained Deep Network (VGG16-$FC7_{cos}$) | {70.11%, 68.13%} | 4096 | 1 × 1 = 1 |
| Local Binary Patterns ($LBP^u_{(24,2),L1}$) | {65.55%, 62.56%} | 555 | 1 × 1 = 1 |
| Histogram of Oriented Gradients ($HOG_{L1}$) | {17.58%, 16.76%} | 648 | 6 × 6 = 36 |

In Table 1, the described methods and systems, are referred to as "ELP" or "Encoded Local Projections". For example, $ELP_{(10,d)}$ uses 10 pixels×10 pixels image portions and encoded representations formed by detached histograms and $ELP_{(10,m)}$ uses 10 pixels×10 pixels image portions and encoded representations formed by merged histograms. For ELP, the direct similarity was measured using Chi-squared ($\chi^2$) distances; for Pre-trained Deep Network (VGG16-$FC7_{cos}$), the direct similarity was measured using cosine distances, and for Local Binary Patterns ($LBP^u_{(24,2),L1}$) and Histogram of Oriented Gradients ($HOG_{L1}$), the direct similarity was measured using city block ($L_1$).

As can be seen in Table 1, ELP performed slightly better than the Pre-trained Deep Network and significantly better than the Local Binary Patterns and the Histogram of Oriented Gradients.

Second, the encoded representations were used for image classification using Support Vector Machines algorithm. The results, along with publicly available benchmarks for Convolutional Neural Networks (CNN), Local Binary Patterns ($LBP_{(24,3)}$), and Bag of Visual Words (BoVW), are summarized in Table 2 below.

TABLE 2

| Method | {Patch-to-Scan Accuracy, Whole-Scan Accuracy} | Length of Histogram ($\|h\|$) |
|---|---|---|
| $ELP^{SVM}_{(10,d)}$ | {82.7%, 79.9%} | 1024 |
| $ELP^{SVM}_{(10,m)}$ | {82.3%, 79.3%} | 256 |
| Pre-trained Deep Network (VGG$^{SVM}_{FC7}$) | {79.5%, 76.9%} | 4096 |
| Local Binary Patterns ($LBP^{SVM}_{(24,2)}$) | {77.8%, 73.3%} | 555 |
| Pre-trained Deep Network (VGG$^{SVM}_{Pool5}$) | {72.5%, 67.2%} | 6272 |
| CNN | {65.0%, 64.8%} | Not available |
| $LBP_{(24,3)}$ | {66.1%, 62.5%} | 555 |
| BoVW | {65.0%, 61.0%} | Not available |

As can be seen in Table 2, ELP identified scans with greater accuracy than Pre-trained Deep Networks), Local Binary Patterns ($LBP^{SVM}_{(24,2)}$), and the publicly available benchmarks.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the drawings, it will be understood that the illustrated user interface text and controls are provided as examples only and are not meant to be limiting. Other suitable user interface elements may be possible.

We claim:

1. A computer-implemented method for generating an encoded representation for one or more images, the method comprising operating a processor to:
   for at least one image portion of a plurality of image portions of an image of the one or more images:
   receive a set of projection data representing an image intensity of the image portion along a plurality of projection directions; and
   identify a subset of projection data from the set of projection data associated with one or more dominant features, wherein the set of projection data comprises a subset of projection data for each projection direction of the plurality of projection directions; and
   generate the encoded representation based at least on a data variation within the subset of projection data associated with the one or more dominant features for the at least one image portion.

2. The method of claim 1 wherein generating the encoded representation based on the data variation within the subset of projection data associated with the one or more dominant features comprises:
   determining a direction of change between each sequential projection data within the subset of projection data associated with the one or more dominant features; and
   converting the direction of change to a binary representation.

3. The method of claim 2 comprises converting the binary representation to an integer value.

4. The method of claim 2 wherein determining the direction of change between each sequential projection data within the subset of projection data associated with the one or more dominant features comprises:
   calculating a derivative for the subset of projection data associated with the one or more dominant features.

5. The method of claim 2 wherein converting the direction of change to the binary representation comprises:
   assigning an increase indicator to an increasing direction of change; and
   assigning a decrease indicator to a decreasing direction of change.

6. The method of claim 1, wherein:
   identifying the subset of projection data associated with the one or more dominant features comprises:
   determining a projection direction associated with the subset of projection data associated with the one or more dominant features and assigning that projection direction as a principal projection direction; and
   selecting one or more supplemental projection directions based on the principal projection direction; and
   generating the encoded representation based on the data variations in the subsets of projection data associated with the principal projection direction and each selected supplemental projection direction.

7. The method of claim 6 comprises:
   for each subset of projection data, representing the data variation in the respective subset of projection data with an integer value; and
   determining an occurrence frequency of each respective integer value.

8. The method of claim 6, wherein selecting the one or more supplemental projection directions based on the principal projection direction comprises:
   assigning the one or more supplemental projection directions to be at substantially equal angular separation from an adjacent supplemental projection direction, and each supplemental projection direction adjacent to the principal projection direction to be at the substantially equal angular separation from the principal projection direction.

9. The method of claim 1, wherein identifying the subset of projection data associated with the one or more dominant features comprises at least one of:
   determining, from the set of projection data, the subset of projection data having a greatest variance; and
   determining, from the set of projection data, the subset of projection data having a greatest value.

10. The method of claim 1 further comprises, for each image portion,
    determining whether a homogeneity level of the image portion exceeds a homogeneity threshold, the homogeneity level representing an intensity variation within the image data intensity of the image portion; and
    in response to determining the homogeneity level of that image portion exceeds the homogeneity threshold, excluding that image portion from the encoded representation, otherwise, indicating that image portion is usable for the encoded representation.

11. A system for generating an encoded representation for one or more images, the system comprising:
    a communication interface to provide access to the one or more images via a network; and a processor in communication with the communication interface, the processor being operable to:

for at least one image portion of a plurality of image portions of an image of the one or more images:

receive a set of projection data representing an image intensity of the image portion along a plurality of projection directions; and identify a subset of projection data from the set of projection data associated with one or more dominant features, wherein the set of projection data comprises a subset of projection data for each projection direction of the plurality of projection directions; and generate the encoded representation based at least on a data variation within the subset of projection data associated with the one or more dominant features for the at least one image portion.

12. The system of claim 11 wherein the processor is operable to:

determine a direction of change between each sequential projection data within the subset of projection data associated with the one or more dominant features; and convert the direction of change to a binary representation.

13. The system of claim 12, wherein the processor is operable to convert the binary representation to an integer value.

14. The system of claim 12 wherein the processor is operable to:

calculate a derivative for the subset of projection data associated with the one or more dominant features.

15. The system of claim 12 wherein the processor is operable to:

assign an increase indicator to an increasing direction of change; and assign a decrease indicator to a decreasing direction of change.

16. The system of claim 11, wherein the processor is operable to:

determine a projection direction associated with the subset of projection data associated with the one or more dominant features and assigning that projection direction as a principal projection direction;

select one or more supplemental projection directions based on the principal projection direction; and generate the encoded representation based on the data variations in the subsets of projection data associated with the principal projection direction and each selected supplemental projection direction.

17. The system of claim 16 wherein the processor is operable to:

for each subset of projection data, represent the data variation in the respective subset of projection data with an integer value; and determine an occurrence frequency of each respective integer value.

18. The system of claim 16, wherein the processor is operable to:

assign the one or more supplemental projection directions to be at substantially equal angular separation from an adjacent supplemental projection direction, and each supplemental projection direction adjacent to the principal projection direction to be at the substantially equal angular separation from the principal projection direction.

19. The system of claim 11, wherein the processor is operable to:

determine, from the set of projection data, the subset of projection data having at least one of a greatest variance and a greatest value.

20. The system of claim 11 wherein the processor is operable to, for each image portion, determine whether a homogeneity level of the image portion exceeds a homogeneity threshold, the homogeneity level representing an intensity variation within the image data intensity of the image portion; and in response to determining the homogeneity level of that image portion exceeds the homogeneity threshold, exclude that image portion from the encoded representation, otherwise, indicate that image portion is usable for the encoded representation.

* * * * *